(12) United States Patent
McIntosh et al.

(10) Patent No.: US 10,373,646 B2
(45) Date of Patent: *Aug. 6, 2019

(54) GENERATION OF LAYOUT OF VIDEOS

(71) Applicant: ALC Holdings, Inc., San Francisco, CA (US)

(72) Inventors: David McIntosh, Del Mar, CA (US); Chris Pennello, Berkeley, CA (US)

(73) Assignee: ALC HOLDINGS, INC., San Francisco, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 15/449,174

(22) Filed: Mar. 3, 2017

(65) Prior Publication Data
US 2017/0270966 A1    Sep. 21, 2017

Related U.S. Application Data

(63) Continuation of application No. 14/173,745, filed on Feb. 5, 2014, now Pat. No. 9,589,594.
(Continued)

(51) Int. Cl.
*G11B 27/031* (2006.01)
*G11B 20/00* (2006.01)
(Continued)

(52) U.S. Cl.
CPC .......... *G11B 27/031* (2013.01); *G06F 3/0484* (2013.01); *G06F 3/04842* (2013.01); *G06F 3/04855* (2013.01); *G06K 9/00751* (2013.01); *G11B 20/00007* (2013.01); *G11B 27/034* (2013.01); *G11B 27/036* (2013.01); *G11B 27/102* (2013.01); *G11B 27/105* (2013.01); *G11B 27/34* (2013.01); *H04N 5/04* (2013.01); *H04N 21/47217* (2013.01); *H04N 21/482* (2013.01); *H04N 21/8455* (2013.01); *H04N 21/8549* (2013.01)

(58) Field of Classification Search
CPC .. G06F 3/0481; G06F 3/04817; G06F 3/0482; G06F 9/4443; G11B 27/34; H04N 5/44543
See application file for complete search history.

(56) References Cited

U.S. PATENT DOCUMENTS 5,630,105 A    5/1997  Itagaki et al.
5,745,103 A    4/1998  Smith
(Continued)

OTHER PUBLICATIONS

Non-Final Rejection, dated May 28, 2015, for U.S. Appl. No. 14/173,697, 14 pages.
(Continued)

*Primary Examiner* — Toan H Vu
(74) *Attorney, Agent, or Firm* — Kilpatrick Townsend & Stockton LLP

(57) ABSTRACT

Providing a method for organizing portions of videos called video previews. The video previews may be associated with a playable group (e.g., one or more other videos that play simultaneously), a video channel (e.g., a collection of videos), or in a particular order for a viewer to browse. Each video channel or video in a channel can provide short, playable video preview that users can use to better decide whether to watch the full video or video channel.

12 Claims, 16 Drawing Sheets

Related U.S. Application Data

(60) Provisional application No. 61/761,096, filed on Feb. 5, 2013, provisional application No. 61/822,105, filed on May 10, 2013, provisional application No. 61/847,996, filed on Jul. 18, 2013, provisional application No. 61/905,772, filed on Nov. 18, 2013.

(51) Int. Cl.

| | | |
|---|---|---|
| *G11B 27/034* | (2006.01) | |
| *G11B 27/036* | (2006.01) | |
| *H04N 5/04* | (2006.01) | |
| *G06F 3/0484* | (2013.01) | |
| *H04N 21/482* | (2011.01) | |
| *H04N 21/8549* | (2011.01) | |
| *G11B 27/34* | (2006.01) | |
| *H04N 21/472* | (2011.01) | |
| *H04N 21/845* | (2011.01) | |
| *G11B 27/10* | (2006.01) | |
| *G06F 3/0485* | (2013.01) | |
| *G06K 9/00* | (2006.01) | |

(56) References Cited

U.S. PATENT DOCUMENTS

| | | |
|---|---|---|
| 5,781,183 A | 7/1998 | Takahashi et al. |
| 6,335,985 B1 | 1/2002 | Sambonsugi et al. |
| 6,526,577 B1 | 2/2003 | Ellis et al. |
| 7,324,119 B1 | 1/2008 | Puri et al. |
| 7,840,661 B2 | 11/2010 | Kalaboukis et al. |
| 7,844,352 B2 | 11/2010 | Vouzis et al. |
| 7,844,354 B2 | 11/2010 | Keohane et al. |
| 8,244,103 B1 | 8/2012 | Shore |
| 8,527,646 B2 | 9/2013 | Khatib et al. |
| 8,610,730 B1 | 12/2013 | Negulescu et al. |
| 8,923,607 B1 | 12/2014 | Kwatra et al. |
| 8,959,453 B1 * | 2/2015 | Harnish ............... H04N 7/0122 715/788 |
| 9,024,868 B2 | 5/2015 | Oka |
| 9,027,064 B1 | 5/2015 | Opare-Abetia et al. |
| 9,077,956 B1 | 7/2015 | Davis et al. |
| 9,158,440 B1 * | 10/2015 | Lider ................... G06F 3/0485 |
| 9,311,824 B2 | 4/2016 | Humphrey |
| 9,349,413 B2 | 5/2016 | Pennello et al. |
| 9,378,283 B2 | 6/2016 | Batraski et al. |
| 2001/0023200 A1 | 9/2001 | Horikawa et al. |
| 2001/0025375 A1 | 9/2001 | Ahmad et al. |
| 2002/0112244 A1 | 8/2002 | Liou et al. |
| 2004/0010687 A1 | 1/2004 | Futa et al. |
| 2004/0089141 A1 | 5/2004 | Georges et al. |
| 2005/0019015 A1 | 1/2005 | Ackley et al. |
| 2005/0091686 A1 | 4/2005 | Sezan et al. |
| 2005/0144016 A1 | 6/2005 | Hewitt et al. |
| 2005/0193341 A1 | 9/2005 | Hayward et al. |
| 2005/0201723 A1 | 9/2005 | Islam et al. |
| 2005/0257152 A1 | 11/2005 | Shimizu et al. |
| 2006/0059504 A1 | 3/2006 | Gomez et al. |
| 2006/0204214 A1 | 9/2006 | Shah et al. |
| 2006/0272000 A1 | 11/2006 | Kwak et al. |
| 2006/0275028 A1 | 12/2006 | Lee et al. |
| 2007/0006262 A1 | 1/2007 | Cleron et al. |
| 2007/0074269 A1 | 3/2007 | Hua et al. |
| 2007/0118801 A1 | 5/2007 | Harshbarger et al. |
| 2007/0136750 A1 | 6/2007 | Abanami et al. |
| 2007/0245379 A1 | 10/2007 | Agnihortri |
| 2008/0036917 A1 | 2/2008 | Pascarella et al. |
| 2008/0136790 A1 | 6/2008 | Hio et al. |
| 2008/0155474 A1 | 6/2008 | Duhig et al. |
| 2008/0178230 A1 | 7/2008 | Eyal et al. |
| 2008/0178234 A1 | 7/2008 | Eyal et al. |
| 2008/0204465 A1 | 8/2008 | McGowan et al. |
| 2008/0273804 A1 | 11/2008 | Malewski et al. |
| 2008/0301579 A1 | 12/2008 | Jonasson et al. |
| 2009/0094159 A1 | 4/2009 | Cunningham et al. |
| 2009/0110363 A1 | 4/2009 | Kim et al. |
| 2009/0172197 A1 | 7/2009 | Kalaboukis |
| 2009/0199251 A1 | 8/2009 | Badoiu et al. |
| 2009/0249421 A1 | 10/2009 | Liu et al. |
| 2010/0023984 A1 | 1/2010 | Davi et al. |
| 2010/0070523 A1 | 3/2010 | Delgo et al. |
| 2010/0125875 A1 | 5/2010 | Hays et al. |
| 2010/0183280 A1 | 7/2010 | Beauregard et al. |
| 2010/0186034 A1 | 7/2010 | Walker et al. |
| 2010/0222906 A1 | 9/2010 | Moulios |
| 2010/0232518 A1 | 9/2010 | Coleman et al. |
| 2010/0260462 A1 | 10/2010 | Zhang et al. |
| 2010/0260468 A1 | 10/2010 | Khatib et al. |
| 2010/0280638 A1 | 11/2010 | Matsuda et al. |
| 2011/0007087 A1 | 1/2011 | Ivanich et al. |
| 2011/0185392 A1 | 7/2011 | Walker et al. |
| 2012/0014533 A1 | 1/2012 | Gough et al. |
| 2012/0017150 A1 | 1/2012 | Pollack et al. |
| 2012/0079529 A1 | 3/2012 | Harris et al. |
| 2012/0099641 A1 | 4/2012 | Bekiares et al. |
| 2012/0120095 A1 | 5/2012 | Yoshitani et al. |
| 2012/0141095 A1 | 6/2012 | Schwesinger et al. |
| 2012/0173981 A1 | 7/2012 | Day et al. |
| 2012/0201517 A1 | 8/2012 | Sakuragi et al. |
| 2012/0278725 A1 | 11/2012 | Gordon et al. |
| 2012/0278764 A1 | 11/2012 | Arriola et al. |
| 2012/0290933 A1 | 11/2012 | Rajaraman et al. |
| 2012/0314943 A1 | 12/2012 | Guerrero et al. |
| 2012/0323897 A1 | 12/2012 | Daher et al. |
| 2012/0328265 A1 | 12/2012 | Sakuragi et al. |
| 2013/0007198 A1 | 1/2013 | Gupta et al. |
| 2013/0018960 A1 | 1/2013 | Knysz et al. |
| 2013/0024895 A1 | 1/2013 | Yong et al. |
| 2013/0031219 A1 | 1/2013 | Liu et al. |
| 2013/0042271 A1 | 2/2013 | Yellin et al. |
| 2013/0047084 A1 | 2/2013 | Sanders et al. |
| 2013/0097238 A1 | 4/2013 | Rogers et al. |
| 2013/0097550 A1 | 4/2013 | Grossman et al. |
| 2013/0125000 A1 | 5/2013 | Fleischhauer et al. |
| 2013/0129317 A1 | 5/2013 | Moorer et al. |
| 2013/0163963 A1 | 6/2013 | Crosland et al. |
| 2013/0174197 A1 | 7/2013 | Gunatilake et al. |
| 2013/0317951 A1 | 11/2013 | Kuznetsov et al. |
| 2014/0079225 A1 | 3/2014 | Jarske et al. |
| 2014/0104494 A1 | 4/2014 | Begeja et al. |
| 2014/0109017 A1 * | 4/2014 | Benko ................ G06F 3/0488 715/858 |
| 2014/0130080 A1 | 5/2014 | Badoiu et al. |
| 2014/0143725 A1 | 5/2014 | Lee et al. |
| 2014/0169766 A1 | 6/2014 | Yu et al. |
| 2014/0219629 A1 | 8/2014 | McIntosh et al. |
| 2014/0219634 A1 | 8/2014 | McIntosh et al. |
| 2014/0219637 A1 | 8/2014 | McIntosh et al. |
| 2014/0223306 A1 | 8/2014 | McIntosh et al. |
| 2014/0223307 A1 | 8/2014 | McIntosh et al. |
| 2014/0223482 A1 | 8/2014 | McIntosh et al. |
| 2014/0325568 A1 | 10/2014 | Hoang et al. |
| 2014/0359656 A1 | 12/2014 | Banica et al. |
| 2014/0372889 A1 * | 12/2014 | Anzures ............. G06F 3/04883 715/719 |
| 2015/0138406 A1 | 5/2015 | Sokeila et al. |
| 2016/0064034 A1 | 3/2016 | Mcintosh et al. |
| 2016/0105725 A1 | 4/2016 | Shore |
| 2016/0217826 A1 | 7/2016 | Mcintosh et al. |

OTHER PUBLICATIONS

Restriction Requirement, dated Jun. 19, 2015, for U.S. Appl. No. 14/173,740, 8 pages.

Non-Final Rejection, dated Jul. 16, 2015, for U.S. Appl. No. 14/173,715, 18 pages.

Notice of Allowance dated Sep. 11, 2015, in U.S. Appl. No. 14/173,740, 9 pages.

Non-Final Office Action dated Nov. 4, 2015, in U.S. Appl. No. 14/173,753, 34 pages.

Non-Final Office Action dated Dec. 17, 2015, for U.S. Appl. No. 14/173,732, 12 pages.

(56) References Cited

OTHER PUBLICATIONS

Notice of Allowance and Fees Due dated Jan. 13, 2016, for U.S. Appl. No. 14/173,715, 5 pages.
Non-final Office Action dated Feb. 11, 2016, for U.S. Appl. No. 14/173,745, 15 pages.
Final Office Action dated Feb. 25, 2016, for U.S. Appl. No. 14/173,697, 16 pages.
Final Office Action dated May 6, 2016, for U.S. Appl. No. 14/173,753, 35 pages.
Final Office Action dated Jul. 26, 2016, in U.S. Appl. No. 14/173,732, 18 pages.
Final Office Action dated May 6, 2016, in U.S. Appl. No. 14/173,753, 41 pages.
Notice of Publication of Application dated Jul. 28, 2016, in U.S. Appl. No. 15/091,358, 1 page.
Corrected Notice of Allowance dated Nov. 25, 2015, in U.S. Appl. No. 14/173,740, 2 pages.
Notice of Allowance dated Aug. 31, 2016, in U.S. Appl. No. 14/173,697, 7 pages.
Notice of allowance dated Sep. 21, 2016, for U.S. Appl. No. 14/173,745, 16 pages.
Non-Final Rejection dated Sep. 23, 2016, for U.S. Appl. No. 14/937,557, 12 pages.
Advisory Action dated Oct. 17, 2016, for U.S. Appl. No. 14/173,732, 3 pages.
Corrected Notice of Allowance dated Nov. 8, 2016, for U.S. Appl. No. 14/173,697, 2 pages.
Non-Final Office Action dated Nov. 21, 2016, for U.S. Appl. No. 14/173,732, 17 pages.
Non-Final Office Action dated Feb. 7, 2017, for U.S. Appl. No. 14/173,753, 37 pages.
Non-Final Office Action dated Apr. 12, 2017, for U.S. Appl. No. 15/091,358, 21 pages.
Final Office Action dated May 12, 2017, for U.S. Appl. No. 14/937,557, 13 pages.
Notice of Allowance dated May 16, 2017, for U.S. Appl. No. 14/173,753, 5 pages.
Restriction Requirement dated Sep. 24, 2015 in U.S. Appl. No. 14/173,732, 7 pages.
Non-Final Office Action dated Jan. 25, 2019 in U.S. Appl. No. 15/882,422, 11 pages.
Advisory Action dated Aug. 9, 2017 in U.S. Appl. No. 14/937,557, 4 pages.
Notice of Allowance dated Aug. 11, 2017 in U.S. Appl. No. 15/091,358, 5 pages.
Notice of Allowance dated Sep. 26, 2017 in U.S. Appl. No. 14/937,557, 9 pages.

* cited by examiner

GENERATION OF LAYOUT OF VIDEOS

CROSS-REFERENCE TO RELATED APPLICATIONS

This application is a continuation of U.S. patent application Ser. No. 14/173,745, filed on Feb. 5, 2014, which is a non-provisional application of U.S. Patent Application No. 61/761,096, filed on Feb. 5, 2013, U.S. Patent Application No. 61/822,105, filed on May 10, 2013, U.S. Patent Application No. 61/847,996, filed on Jul. 18, 2013, and U.S. Patent Application No. 61/905,772, filed on Nov. 18, 2013, which are herein incorporated by reference in their entirety for all purposes.

This application is related to commonly owned and concurrently filed U.S. patent application Ser. No. 14/173,697, entitled "Video Preview with Link", U.S. patent application Ser. No. 14/173,715, entitled "User Interface for Video Preview Creation", U.S. patent application Ser. No. 14/173,732, entitled "Video Preview Creation based on Environment", U.S. patent application Ser. No. 14/173,740, entitled "Video Preview Creation with Audio", U.S. patent application Ser. No. 14/173,753, entitled "Activating a Video Based on Location in Screen", which are herein incorporated by reference in their entirety for all purposes.

BACKGROUND

Users commonly provide video content to websites (e.g., YouTube®), which can be referred to as "posting a video." For example, the user can associate a title, a static thumbnail image, and/or a textual description with the video. Other users (e.g., viewers) can access and view this content via the websites. For example, the viewers can see a video's title and static thumbnail of the video before deciding whether to play the full video. However, the viewers may find it difficult to select particular videos of interest because the title may not be descriptive of the contents of the video, the static thumbnail image may not summarize the essence of the video, or the textual description with the video may be a poor signal for whether the video will be interesting to the viewer. Thus, the viewers may spend significant amounts of time searching and watching videos that are not enjoyable to the viewer.

Additionally, if the viewer selects and starts watching a video, it often takes the viewer a significant amount of time before the viewer can determine whether they like the video and want to keep watching, or whether they want to select another video. When the videos are relatively short (e.g., 3 minutes), the viewer may watch a substantial portion of the video before they can determine whether they would be interested in viewing the video. This process can often be frustrating to a viewers who are accustomed to instant gratification provided by other consumer internet services, and the viewers may stop watching internet videos because it takes too long for them to find an interesting video to watch.

SUMMARY

Embodiments of the present invention provide methods, systems, and apparatuses for viewing portions of videos called "video previews." Once the video previews are created, they may be organized in a layout for a viewer to browse. The layout can comprise composites of video previews, a video preview that identifies a channel (e.g., of video previews, of full videos), clusters of simultaneously playing video previews, and the like. Embodiments can organize video previews and channels to be visually pleasing and efficient for a viewer.

Each video channel or video in a channel can provide short, playable video preview that users can view to better decide whether to watch the full video or video channel. For example, when the video preview moves to a particular location on a display, the video preview may start playing (e.g., within a frame object). In another example, if the viewer selects a video preview, a full video associated with the video preview can be provided. In another example, a video preview can represent the video channel or collection, and a selection of the video preview can provide an interface with video previews of the videos of the channel. Other embodiments are directed to systems and computer readable media associated with methods described herein.

A better understanding of the nature and advantages of the present invention may be gained with reference to the following detailed description and the accompanying drawings.

DEFINITIONS

Figure 1:
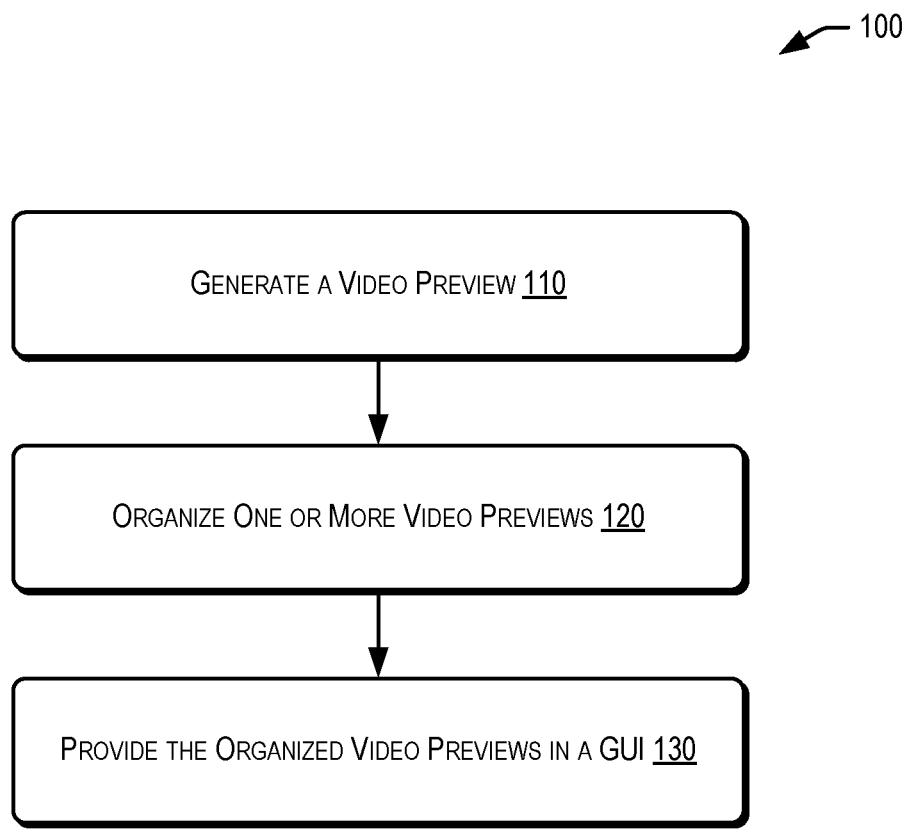
FIG. 1 shows a flowchart illustrating a method of creating a video preview, organizing the video previews, and providing a user interface that includes the video previews according to an embodiment of the present invention.

A "video preview" is a visual representation of a portion of a video (also referred to as a "full video" to contrast a "video preview" of the video). The full video may correspond to the entirety of a video file or a portion of the video file, e.g., when only a portion of the video file has been streamed to a user device. The preview may be shorter than the full video and the full video can be shorter than the complete video file. The preview can convey the essence of the full video. The video preview is shorter (e.g., fewer images, less time) than a full (e.g., more images, longer time, substantially complete) video. In various embodiments, a preview can be a continuous portion of the full video or include successive frames that are not continuous in the full video (e.g., two successive frames of the preview may actually be one or more seconds apart in the full video).

A "video preview block" (also referred to simply as "block") is an area where the video preview will be played. The video preview block can be a square (e.g., 1"×1") or rectangle (e.g., 4"×3", 16"×9"). The video preview can play within the confined space of the video preview block. A user may determine an appropriate video preview block to use with each video preview. In some embodiments, the video preview block may use a frame object to create the video preview block.

A "frame object" is an object on a GUI that is configured to play a video previews (e.g., an iframe, a frame in a current window, frame buffer object (FBO)). Frame objects (e.g., placeholders, 2-dimensional boxes, windows, squares) can be generated by a computing device for displaying the video preview. In some embodiments, the frame object will also provide filters or effects for the video preview (e.g., defined by the computing device, defined by a programming language that generates a frame object class).

A "composite of video previews" (also referred to simply as a "composite" or "preview composite") is an area where one or more related video preview blocks will be played. If the composite has one video preview, then the composite simply corresponds to playing the preview, and the block and composite can correspond to the same area. When the composite includes multiple previews, the composite includes multiple blocks, each playing a preview. The video previews in a composite can each link to the same full video. In one embodiment, the creator of a preview can identify the previews to include in a composite, and the composite can exist as a single display object, where the previews of the composite start playing at the time the composite is activated. The shape of a composite of video previews can be a square (2 blocks×2 blocks, N blocks×N blocks) or rectangle (1×N, 2×N, 2×2 with blocks comprising unequal sides, N×N with blocks comprising unequal sides). The composite of video previews may have a right-wise or left-wise orientation.

A "cluster of video previews" (also referred to simply as a "cluster") is a group of composites that are grouped together because they are related in some way. In one embodiment, the composites may relate to each other and be placed in a cluster imply by being next to each other in a stream of video previews pulled from a queue by a server. In another embodiment, the composites in a cluster may be filtered by category, popular items, and/or trending items, and thus the composites of a cluster may be related to each by the matching filter criteria. Each composite in the cluster can link to different full videos.

A "layout" is a presentation of one or more clusters. A layout may be displayed on a webpage as a stream of video previews that places new clusters of video previews at the top of the stream when the webpage is refreshed. The shape of the composites in each cluster may be analyzed by an algorithm before the cluster is placed in the layout, so that the shapes follow a set of aesthetic rules. For example, the clusters in the layout may be organized so that the composites in the cluster are different shapes than the composites in the cluster next to it. Other rules may avoid placing clusters near other clusters that both have composites of video previews with a vertical separator in the same position. Still other rules may alternate clusters of video previews based on the shapes of the composite of video previews in the cluster (1×2 composite first, 2×2 composite second, single composite third, etc.). The layout may be selected by a curator or automated algorithm.

A "channel" or "collection" is a group of related videos that is accessible by a user and organized in a layout. For example, a user may decide to associate three composites (e.g., video previews relating to baking a cake, baking a cookie, and freezing ice cream) in a single collection called "Desserts I Love." Once the user associates the three composites, the composites may form a cluster. The cluster may be organized in a layout that will make it aesthetically pleasing for other users to view the cluster. The user can access their collection called "Desserts I Love" through a web browser, like a bookmarked area or toolbar, at a later time. Once the user accesses their collection, each of the composites that the user has associated with this collection can be displayed so the user can easily access them again.

DETAILED DESCRIPTION

Embodiments of the present invention can enhance video viewing by providing short, playable video previews in a layout. Users or viewers (used interchangeably) can watch the video previews provided through a website, computing device, messaging service, television, or other devices to better decide whether to watch a full video or channel of videos.

I. Providing Video Previews

FIG. 1 shows a flowchart illustrating a method 100 of creating a video preview, organizing the video previews, and providing a user interface that includes the video previews according to an embodiment of the present invention. The method 100 may comprise a plurality of steps for implementing an embodiment of creating a video preview with a link performed by various computing devices (e.g., video server, provider server, user device, third party server).

At step 110, a video preview may be generated. Embodiments of the invention may provide a graphical user interface for a user that allows the user to select a portion of a video (e.g., a full video) to use as a video preview. The system may generate the video preview based on the input received from the user. The input may be active (e.g., the user providing an identification of a video portion of a full video) or passive (e.g., a plurality of users view a section of the full video a threshold number of times, which identifies a video portion of a full video). Additional means of generating video previews can be found in U.S. patent application Ser. No. 14/173,697, entitled "Video Preview Creation with Link", U.S. patent application Ser. No. 14/173,715, entitled "User Interface for Video Preview Creation", U.S. patent application Ser. No. 14/173,732, entitled "Video Preview Creation based on Environment", and U.S. patent application Ser. No. 14/173,740, entitled "Video Preview Creation with Audio", which are incorporated by reference in their entirety.

At step 120, one or more video previews may be organized into one or more channels or collections. For example, the method 100 can associate the video preview generated in step 110 (e.g., a 4-second animated GIF of a snowboarder jumping off a ledge) with a channel (e.g., a collection of videos about snowboarders). In some embodiments, the video previews may be organized in a group (e.g., a composite, a playable group, a cluster of video previews) and displayed on a network page.

At step 130, a GUI may be provided with the video previews. For example, the GUI may provide one or more channels (e.g., channel relating to snowboarders, channel relating to counter cultures), one or more videos within a channel (e.g., a first snowboarding video, a second snowboarding video, and a first counter culture video), or a network page displaying one or more video previews. The video previews may be shared through social networking pages, text messaging, or other means. Additional information about viewing and sharing video previews can be found in U.S. patent application Ser. No. 14/173,753, entitled "Activating a Video Based on Location in Screen", which is incorporated by reference in its entirety.

II. System for Providing Video Previews

Various systems and computing devices can be involved with various workflows used to activate a video based on a location in a screen.

Figure 2:
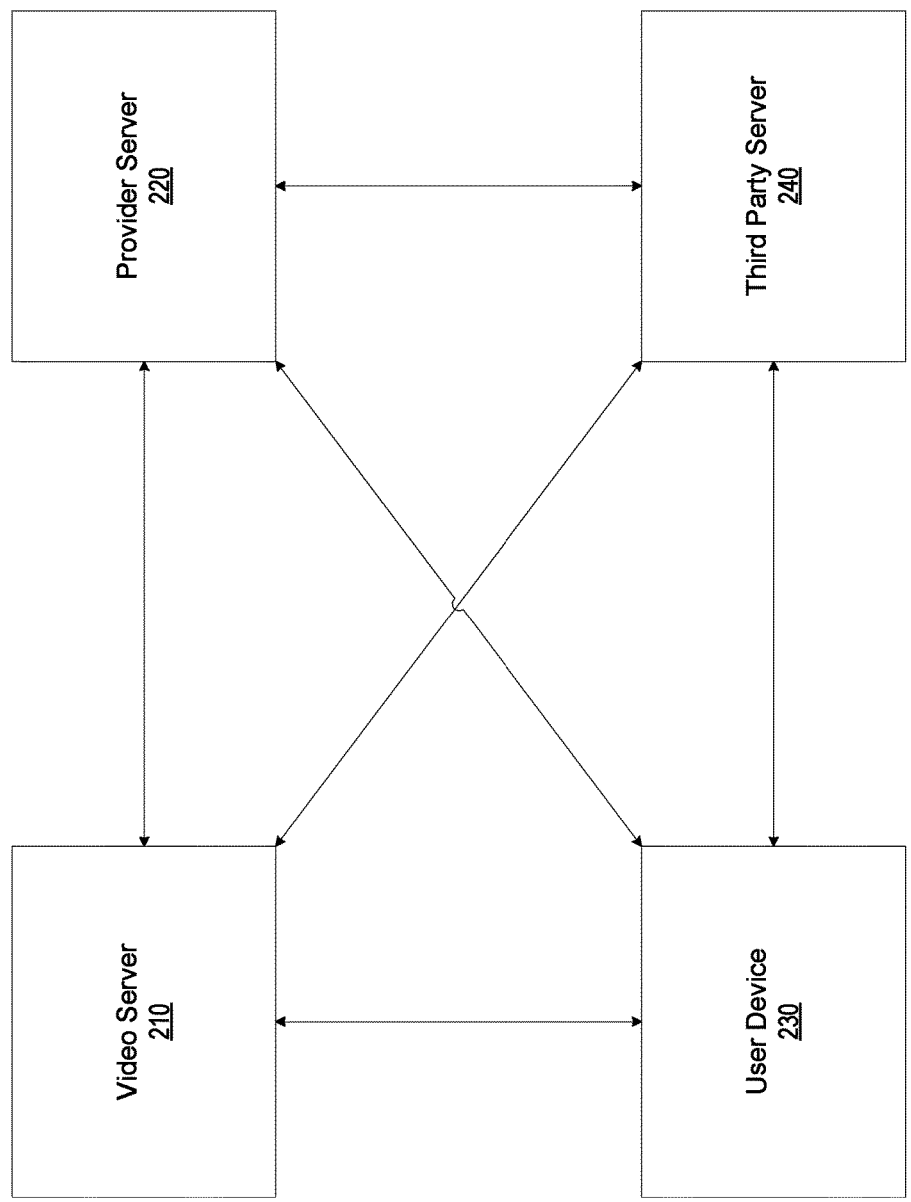
FIG. 2 shows block diagrams of various subsystems used to generate or provide a video preview.

FIG. 2 shows block diagrams of various subsystems used to generate or provide a video preview. For example, the computing devices can include a video server 210, a provider server 220, a user device 230, or a third party server 240 according to an embodiment of the present invention. In some embodiments, any or all of these servers, subsystems, or devices may be considered a computing device.

The computing devices can be implemented various ways without diverting from the essence of the invention. For example, the video server 210 can provide, transmit, and store full videos and/or video previews (e.g., Ooyala®, Brightcove®, Vimeo®, YouTube®, CNN®, NFL®, Hulu®, Vevo®). The provider server 220 can interact with the video server 210 to provide the video previews. In some embodiments, the provider server 220 can receive information to generate the video preview (e.g., a timestamp to a location in the full video, the link to the full video, the full video file, a push notification including the link to the full video). The user device 230 can receive a video preview and/or full video to view, browse, or store the generated video previews. The third party server 240 can also receive a video preview and/or full video to view or browse the generated video previews. In some embodiments, the user device 230 or third party server 240 can also be used to generate the video preview or create a frame object. Additional information about the video server 210, provider server 220, user device 230, and third party server 240 can be found in U.S. patent application Ser. No. 14/173,697, entitled "Video Preview Creation with Link" and U.S. patent application Ser. No. 14/173,715, entitled "User Interface for Video Preview Creation", which are incorporated by reference in their entirety.

In some embodiments, the video server 210, provider server 220, a user device 230, and third party server 240 can be used to generate a playable group. For example, the computing device (e.g., provider server 220, user device 230) may receive a video preview that comprises one or more images and one or more identifiers. The images may be associated with a video portion of the full video that corresponds to a series of images from the full video. The identifiers can help define the video preview (e.g., using metadata, using identifiers defined by a user or computing device). The computing device can receive a second video preview, also with one or more images and one or more identifiers. The identifiers can be associated with content in each video preview.

The computing device can analyze the one or more first identifiers and the one or more second identifiers to identify a shared value between the first identifiers and the second identifiers. For example, the identifiers can include terms like "sports" "television" and "comedy." When two or more video previews share a similar identifier (e.g., both are related to comedy), the computing device can identify the shared value between the two.

A playable group can be generated based on the shared value. For example, a playable group can include at least the first video preview and the second video preview in a combined group of video previews. The playable group can include the video previews based on the shared value between the one or more first and the one or more second identifiers. In some instances, the video previews in the playable group play simultaneously when the playable group is activated.

III. Identifying a Playable Group

Figure 3:
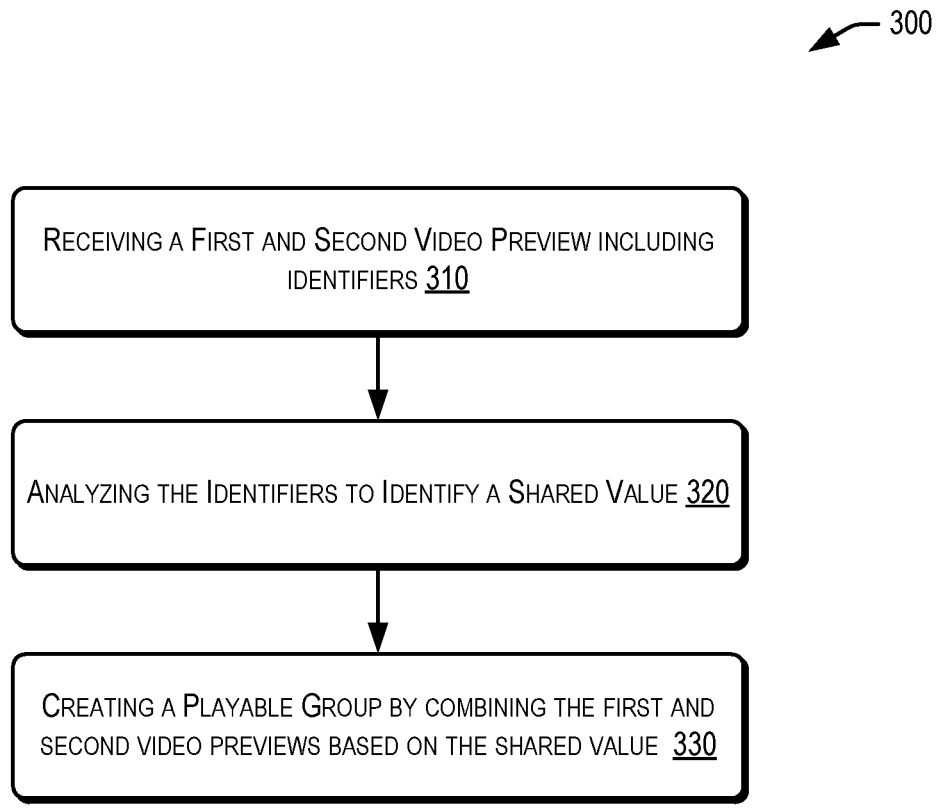
FIG. 3 shows a flowchart illustrating a method of generating a layout for playing videos according to an embodiment of the present invention.

FIG. 3 shows a flowchart illustrating a method 300 of generating a layout for playing videos according to an embodiment of the present invention. In one embodiment, method 300 can be performed by a user device that is displaying the video previews. In another embodiment, method 300 can be performed by a server that provides video previews to a use device.

At block 310, a first and second video preview can be received. For example, the video previews can include one or more identifiers associated with content of the video previews. The video previews can be received at the same time or different times, including in different transmissions or from different sources.

Identifiers can also be received with the video previews. The identifiers may be associated with the content of the video preview (e.g., one or more first identifiers for the first video preview, one or more second identifiers with the second video preview). For example, identifiers can correspond with metadata associated with the video preview (e.g., user name, original source, file size, date generated). In another example, identifiers may correspond with categories associated with the video previews (e.g., sports, television, comedy). The categories may be determined through the title, caption, description, user input, metadata, any channel or collection groupings associated with the video preview, or other information associated with the video preview.

At block 320, identifiers associated with the video previews can be analyzed. For example, the identifiers can be compared to determine if one or more identifiers associated with the first video preview match any of the one or more identifiers associated with the second video preview. As an illustration, the first video preview can be associated with identifiers "created by user Tony," "size=1 k," "category=television," and "category=comedy," and the second video preview can be associated with identifiers "created date=Jan. 26, 2014," "color scheme=RGBA," "category=movies," and "category=comedy." In some embodiments, the identifiers can be a number (e.g., 0.5, 100, one-hundred, etc.). The computing device can identify that the first video preview and the second video preview share a common identifier (e.g., "category=comedy" or "comedy"). The computing device can identify the shared value between the first identifiers and the second identifiers. In some embodiments, the shared value can identify video previews (e.g., a first video preview and second video preview) as being from the same full video. In some embodiments, the shared value can be a range (e.g., the identifiers are 10, 20, and 30, and the shared value is one or more values in the range between 15-50).

In an embodiment, one or more identifiers can be associated with a larger category (e.g., "sports" includes baseball, football, and tennis). When a larger category is identified, the larger category may not be received with the video preview. For example, the video preview can include the identifier "tennis" and the computing device (e.g., provider server 220) can identify the larger "sports" category based on the received identifier (e.g., by looking up the value in a database, by reviewing a list of associated values with identifiers, etc.). For example, "tennis" could be a sub-category of the larger category "sports."

At block 330, a playable group can be created. For example, the first video preview and second video preview may be associated as a playable group based on the shared value (e.g., comedy). The playable group can be a combination of at least the first video preview and the second video preview based on the shared value.

The video previews in a playable group may be adjusted. One way to adjust the video previews may be by an aspect ratio associated with one or more video previews in the playable group. For example, the computing device may determine a first aspect ratio associated with the first video preview and adjust a second aspect ratio associated with the second video preview to correspond with the first aspect ratio. The adjusted second aspect ratio can enable the first video preview and second video preview to be displayed on a single row in a series of playable groups in the GUI. As an illustration, the width of the GUI is 100 pixels and the width of each video preview is 60 pixels. The width of the first video preview may remain at 60 pixels while the width (e.g., and corresponding height) of the second video preview may be adjusted to 40 pixels. In another illustration, the width (e.g., and corresponding height) of both video previews may be adjusted to 50 pixels.

In an embodiment, a playable group is provided to the GUI after the playable group is created. The playable group may be activated (e.g., by moving to a particular location, by a user's interaction with the playable group, by default when the GUI is opened by an application). Once the activation is identified, the GUI can play the video previews associated with the playable group. For example, the GUI can play the video portion in a continuous loop, a limited loop that would stop after a certain number of times, or stop after one time. The GUI may also play the video preview forwards and/or backwards.

More than one playable group may be created. For example, a first playable group can consist of the first and second video previews. A third video preview can be received that includes one or more third identifiers associated with content of the third video preview. The computing device can create a second playable group that includes the third video preview to be displayed in a single row and display a series of playable groups that includes the first playable group and the second playable group. In some examples, the playable groups can be activated and deactivated (e.g., played and stopped from playing). As illustrated, the first playable group may play, and then become deactivated. The second playable group can begin playing when the second playable group is activated. In some examples, the second playable group is activated at a same time or after the first playable group is deactivated.

One or more categories may also be determined with one or more playable groups. As illustrated, a third video category can be associated with the third video preview. When a fourth video preview is received, a fourth video category can be determined and associated with the fourth video preview. The third and fourth categories can be compared. When the third video category and the fourth video category are the same, the fourth video preview can be added to the second playable group of video previews. In another example, when the third video category and the fourth video category are different, the computing device can identify a third playable group of video previews and include the fourth video preview with the third playable group. The series of video previews may also be updated to include the third playable group of video previews (e.g., with the first and second playable groups created earlier).

IV. Grouping Video Previews in a Playable Group

A. GUI for Defining a Playable Group

Figure 4:
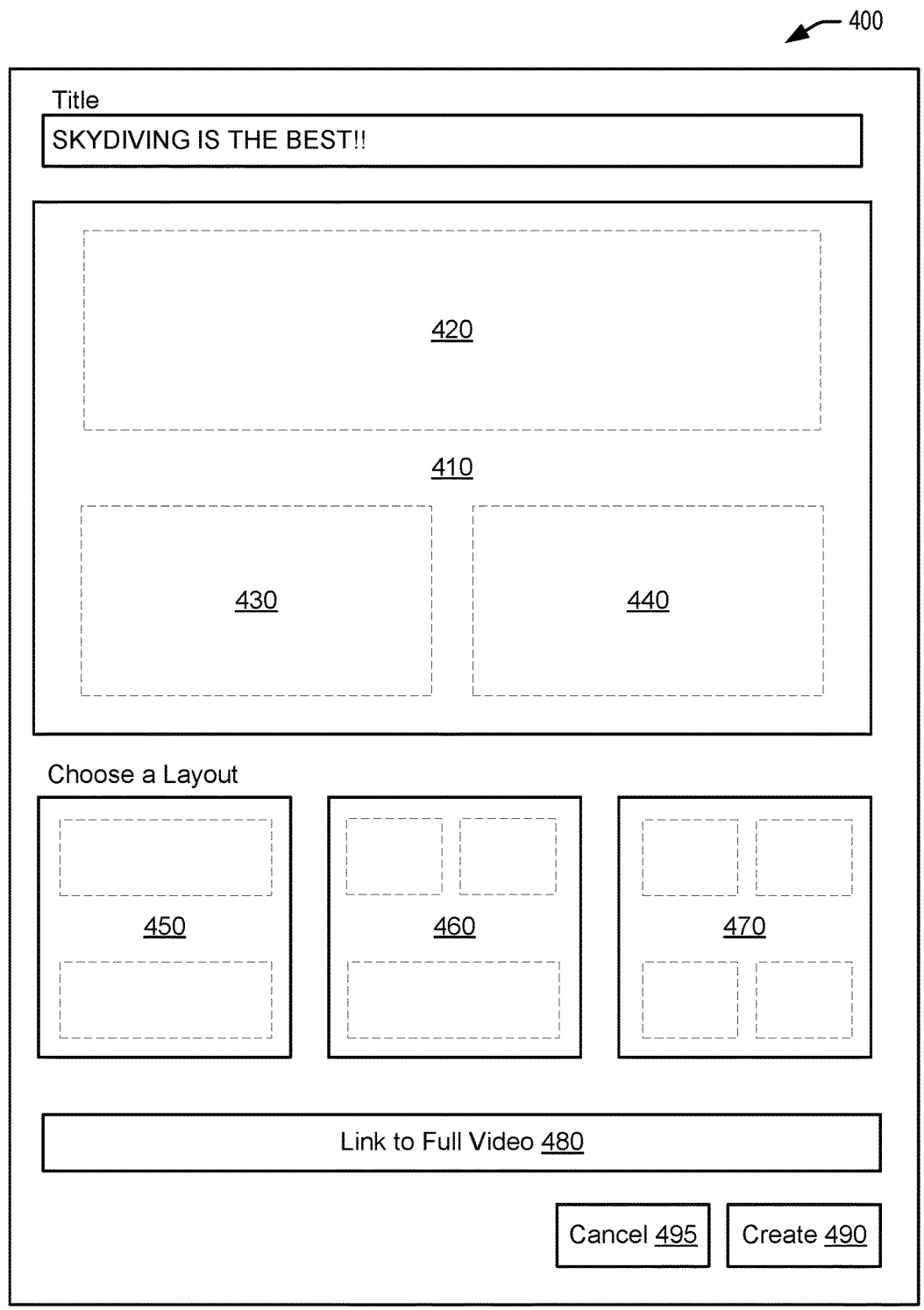
FIG. 4 shows a graphical user interface that allows a user to group videos that are provided together according to an embodiment of the present invention.

FIG. 4 shows a graphical user interface (GUI) that allows a user to group videos that are provided together according to an embodiment of the present invention. The GUI 400 can include a playable group 410, including a first video preview 420, second video preview 430, and third video preview 440, and a portion of the GUI where the user may choose a layout, including the shape options of video previews in the playable group (e.g., known as blocks or composites), including a first option 450, second option 460, and third option 470. The GUI 400 may also accept a link to a full video 480 (or any other means of identifying a full video), a create tool 490, and cancel tool 495.

The playable group 410 can combine one or more video previews (e.g., 420, 430, 440) based on the shared value between the video previews. For example, the user can identify the identifier for these video previews and identify the shapes of the video previews that will play in the playable group by selecting a block formation from the list of options.

The user (e.g., and/or computing device) may chose other block options as well. In one example, the GUI 400 can show a block option with one larger block of video previews on one row and second row with two smaller blocks of video previews (e.g., 410). In other examples, the options can include two rows with similar sized blocks (e.g., 450), a first row with a larger block and a second row with two smaller blocks, or vice versa (e.g., 460), or two rows with two smaller blocks in each row (e.g., 470). In some examples, the video previews associated with these blocks may play simultaneously when activated.

Users can create multiple video previews and organize the video previews to play simultaneously. For example, the user may create four video previews from one full video and organize the video previews in a 2-by-2 box, so that two videos are in two rows, and two videos are in two columns. The four video previews can play at the same time. Video previews may be placed in a block of video previews, which can limit the size or shape of the area for the video preview to play. Video previews may be placed in a composite of video previews, which can correlate one or more video previews with other video previews. These and other video preview layouts can be advantageous because users can often more effectively communicate a point with several simultaneously playing previews that each convey a separate angle of element of a given scene, and thus the viewer can better understand the full video or channel.

Users may select a video preview from one video or channel, but associate it with a different video or channel that the user believes is well-represented by the video preview. The video preview can represent a single video, or a channel/collection of videos. The users (e.g., video preview creators) or viewers (e.g., video watchers) may interact with the video previews in the form of "liking", "commenting", or "collecting" the videos. Data gathered from the interactions can be used to suggest relevant video previews for a given video or channel to the user. For example, a channel may comprise ten videos and three of those videos have video previews. Users and viewers may have provided feedback on a particular video preview the most (e.g. by liking the video preview) and the computing device may use that particular video preview as the representative video preview for a given channel.

In one embodiment, the user may select multiple videos to incorporate into one or more video previews for a channel. For example, the user can include "snippets" or portions of one or more video previews to generate a composite video preview for the channel (e.g., a channel of a particular actor where the video preview showcases some of the actor's memorable moments).

B. Shapes and Dimensions of Video Previews in a Playable Group

Figure 5:
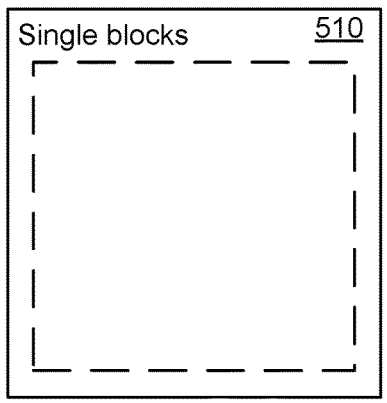
FIG. 5 shows several illustrations of videos according to an embodiment of the present invention.
Figure 5:
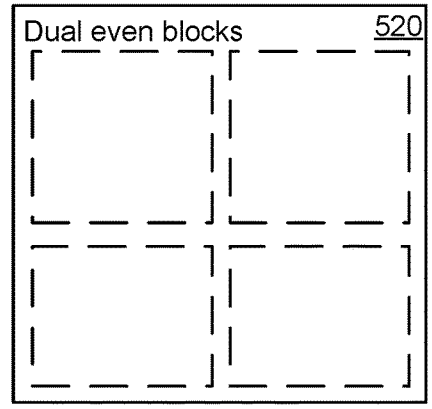
Figure 5:
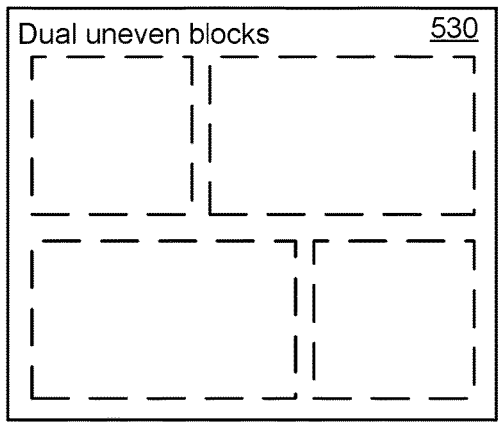
Figure 5:
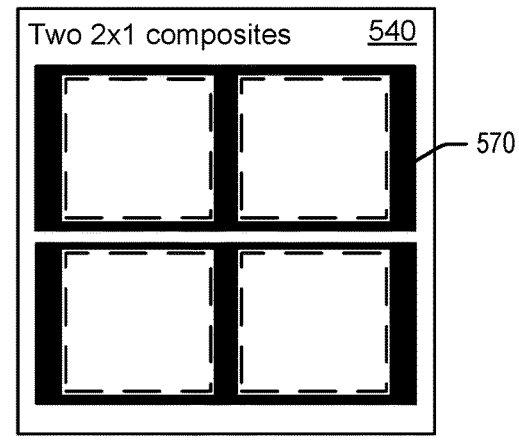
Figure 5:
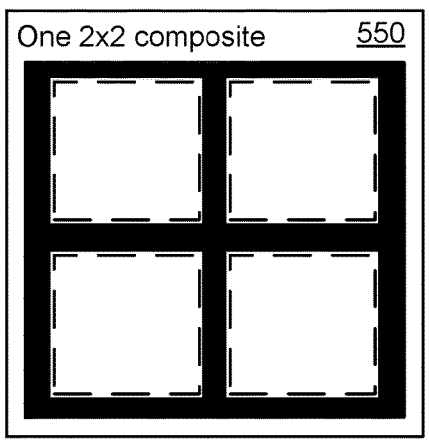
Figure 5:
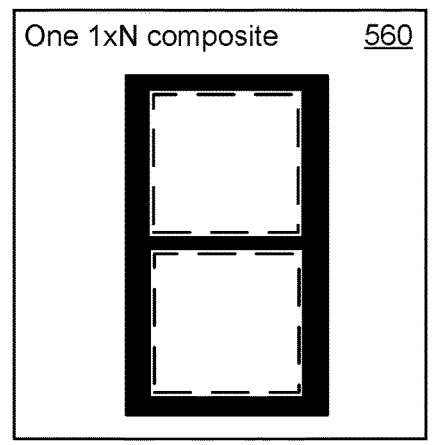

FIG. 5 shows several illustrations of videos according to an embodiment of the present invention. A "video preview block" (also referred to simply as "block") is an area where the video preview will be played. The video preview block can be a square (e.g., 1"×1") or rectangle (e.g., 4"×3", 16"×9"). The video preview can play within the confined space of the video preview block. A user may determine an appropriate video preview block to use with each video preview. For example, there may be a variety of different video preview blocks, including formats 510, 520, and 530. Format 510 shows a single video preview block (e.g., single 1×1 video preview), format 520 includes dual even blocks of video previews, and format 530 includes dual uneven blocks of video previews.

As illustrated, format 530 may correspond with an orientation, including right-wise and left-wise orientations. For example, if the orientation is right-wise, the 16:9 video preview can be located on the right, and if the orientation is left-wise, the 16:9 can be located on the left. The orientation of the blocks can advantageously contribute to visual diversity.

A "composite of video previews" (also referred to simply as a "composite" or "preview composite") is an area where a plurality of related video preview blocks can be played. If the composite has one video preview, then the composite simply corresponds to playing the preview, and the block and composite can correspond to the same area. When the composite includes multiple previews, the composite includes multiple blocks, each playing a preview. A composite with multiple previews is shown within a block box to distinguish it from single blocks. The video previews in a composite can each link to the same full video. In one embodiment, the creator of a preview can identify the previews to include in a composite, and the composite can exist as a single display object, where the previews of the composite start playing at the time the composite is activated.

The shape of a composite of video previews can be a square (2 blocks×2 blocks, N blocks×N blocks) or rectangle (1×N, 2×N, 2×2 with blocks comprising unequal sides, N×N with blocks comprising unequal sides). The composite of video previews may have a right-wise or left-wise orientation. For example, composite blocks may be identified by a light-colored border around the layout blocks, as shown in formats 540, 550, and 560.

Additional formats of video previews are also possible, including formats that include a composite 570 (e.g., illustrated by a black box that may not be displayed in a layout with the video previews). A composite of video previews can include an area where one or more related video preview blocks will be played. In some embodiments, the composite 570 includes multiple previews that each plays a video preview. The video previews in a composite can link to the same full video. For example, format 540 shows two 2×1 composites of video previews (e.g., two examples of 2 blocks for each column by 1 block for each row), format 550 shows a 2×2 composite of video previews, and format 560 shows a 1×N composite of video previews, where N represents some integer number (e.g., 1 column×N rows). In this instance, N represents 2 because there are two rows of video previews.

Figure 6:
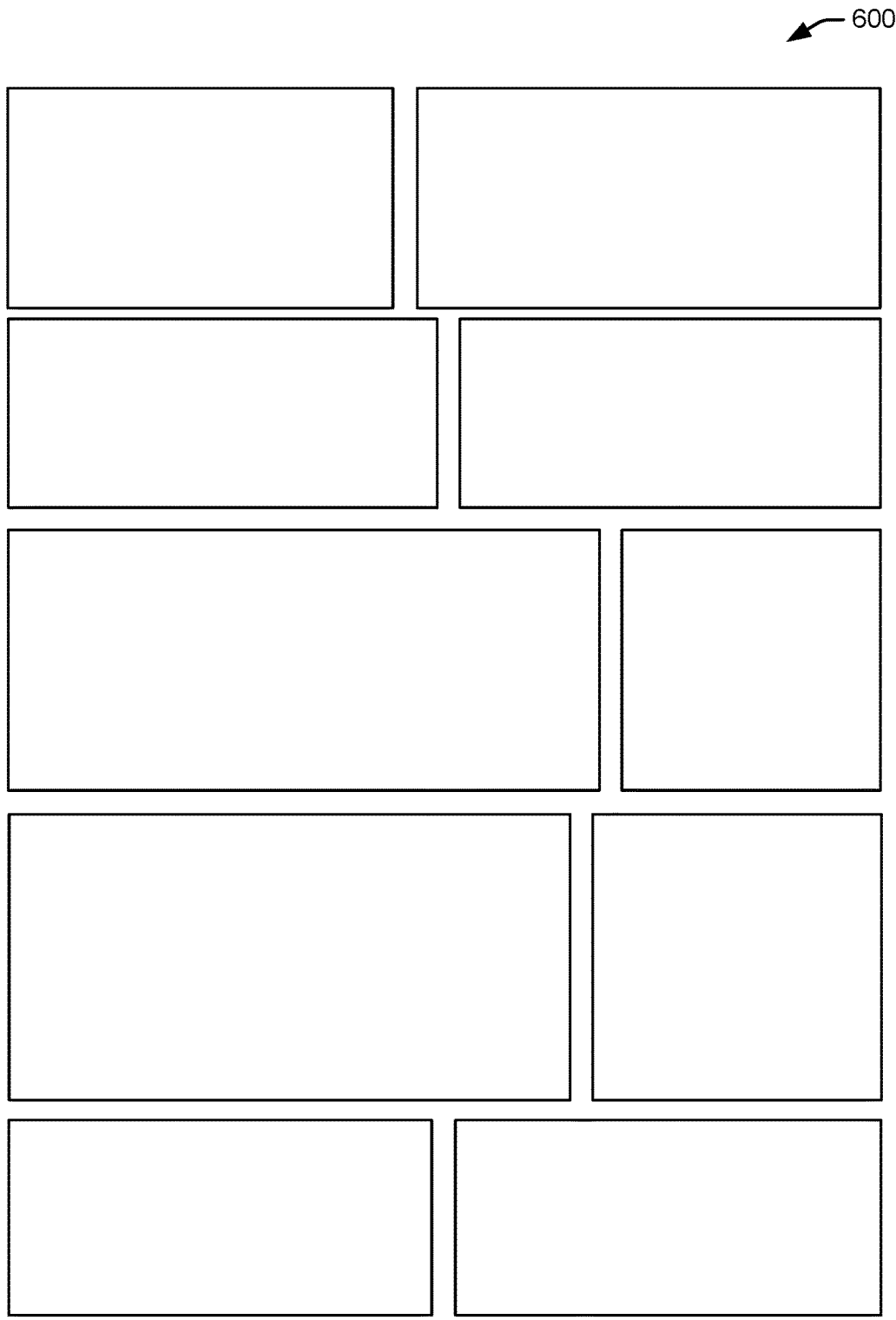
FIG. 6 shows several illustrations of grouped videos with an adjusted aspect ratio according to an embodiment of the present invention.

FIG. 6 shows several illustrations of grouped videos with an adjusted aspect ratio according to an embodiment of the present invention. In some embodiments, the size of the blocks may be relative to other blocks in the layout. For example, as shown in GUI 600, the height or width of the block can be adjusted to substantially fill the width of the GUI or the screen that displays the GUI.

The height of each block may be calculated (e.g., by the computing device). For example, as illustrated earlier, the width of the GUI is 100 pixels (e.g., variable "w"). The aspect ratio for each block may be 1 to 1. When the aspect ratio for the first block is variable "a1" and the aspect ratio for the second block is variable "a2," the height of each block can be calculated, such that height(h)=w/(a1+a2), or h=200. In other words, the height reserved for the two blocks in the GUI should be twice that of one width of the blocks (e.g., since the blocks are stacked on top of each other).

C. Examples of Video Previews in Playable Groups

Figure 7:
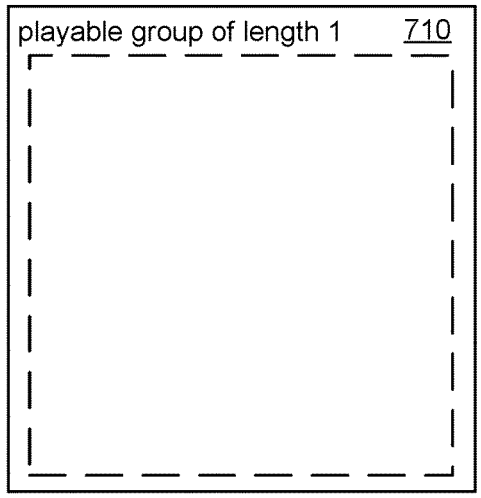
FIG. 7 shows several illustrations of playable groups according to an embodiment of the present invention.
Figure 7:
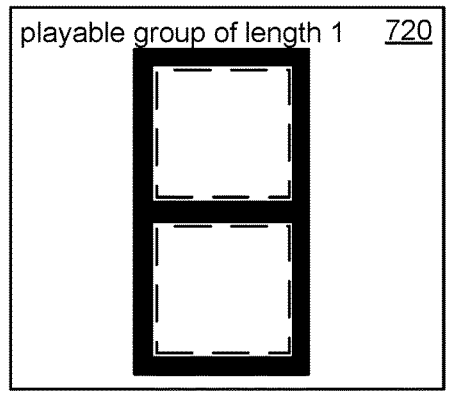
Figure 7:
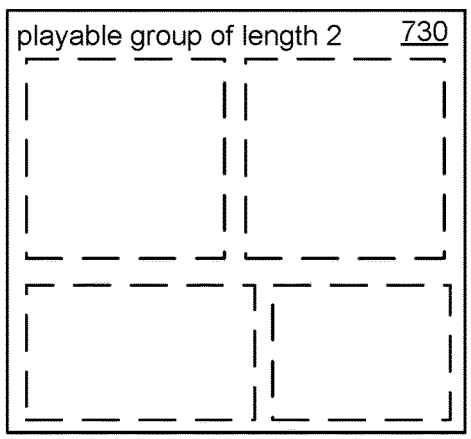
Figure 7:
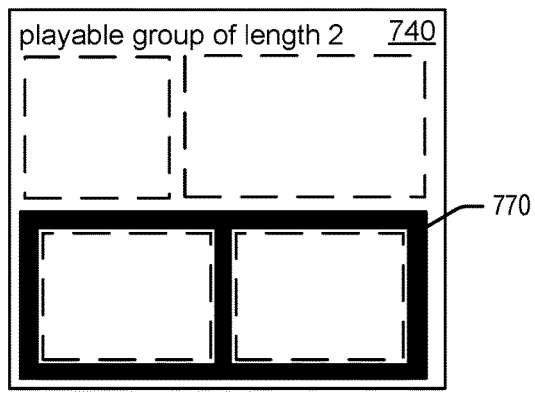
Figure 7:
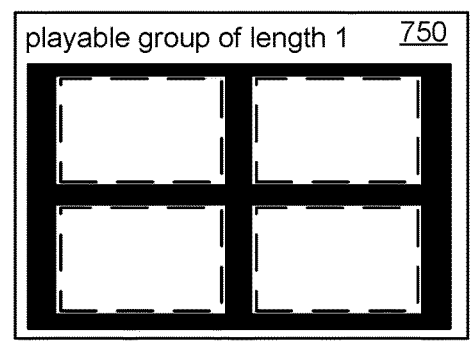
Figure 7:
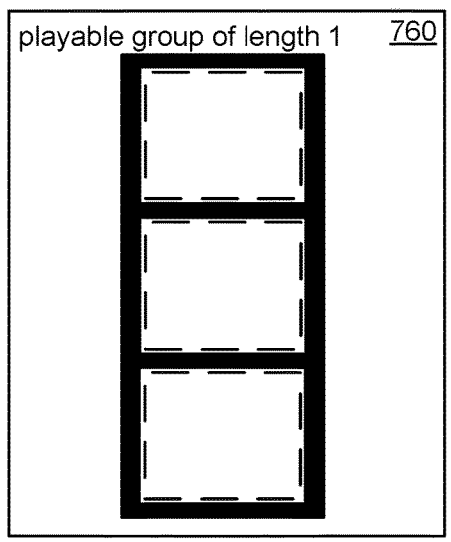

FIG. 7 shows several illustrations of playable groups according to an embodiment of the present invention. The playable groups can comprise one or more video previews in composites that are similar to the composites shown in FIG. 5. The playable groups can include one or more clusters. A cluster of video previews is a group of composites that are grouped together because they are related in some way.

A playable grouping may be the simplest cluster, with a focus on limiting each of the video previews in a composite to be fully visible and play within a viewable area. In an embodiment, a playable group may be limited to one or two clusters, and contain as few as one video preview. The computing device can create the playable group with these and other restrictions to the format of clusters. For example, two dual blocks, one single and one dual, one single and a 2×1 composite, one dual and a 2×1 composite, or both 2×1 composite, can be valid clusters. In an embodiment, an algorithm or process may be implemented to construct maximal playable groups.

Various playable groups are possible. For example, format 710 shows a cluster of length one, comprised of a single composite. Format 720 shows a cluster of length one, comprised of a 1×2 composite. Format 730 shows a cluster of length two, comprised of four composites. Format 740 shows a cluster of length two, comprised of three composites. Format 750 shows a cluster of length one, comprised of a 2×2 composite. Format 760 shows a cluster of length one, comprised of a 1×3 composite.

The clusters that include one or more composites 770 can be illustrated by a black box. The black box may not be displayed in a layout with the video previews, but can illustrate the one or more video previews that are played simultaneously. In some embodiments, the playable groups can include video previews as single blocks and composites. For example, in format 740, that displays a cluster of length two comprised of three composites, the top left video preview can play a video preview associated with a first full video, the top right video preview can play a video preview associated with a second full video, and the bottom two video previews can play two video previews associated with a third full video.

Figure 8:
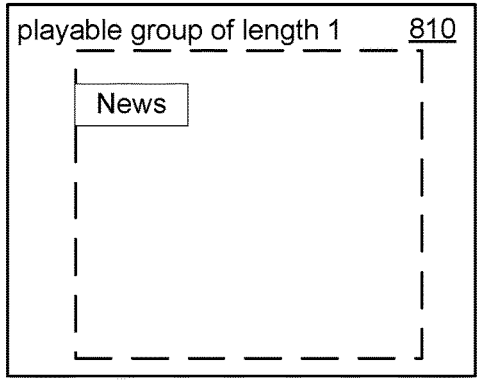
FIG. 8 shows several illustrations of playable groups associated with one or more identifiers according to an embodiment of the present invention.
Figure 8:
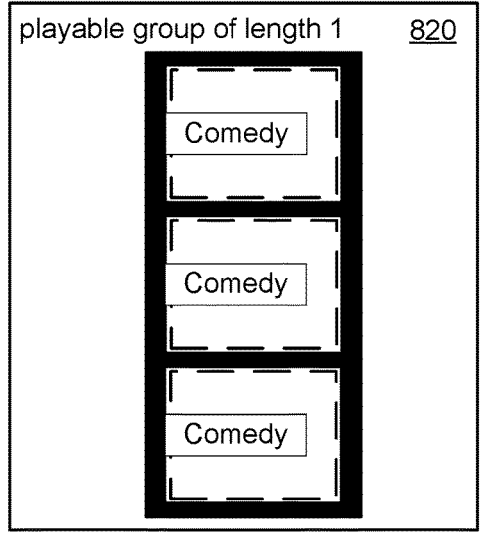
Figure 8:
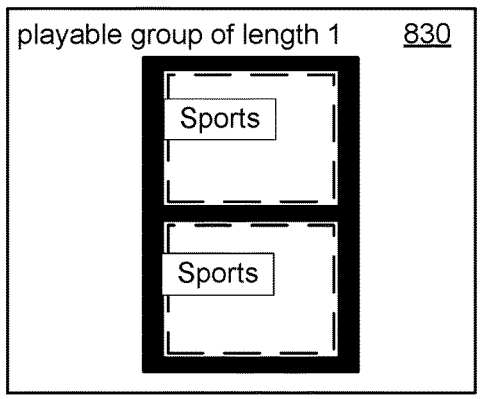
Figure 8:
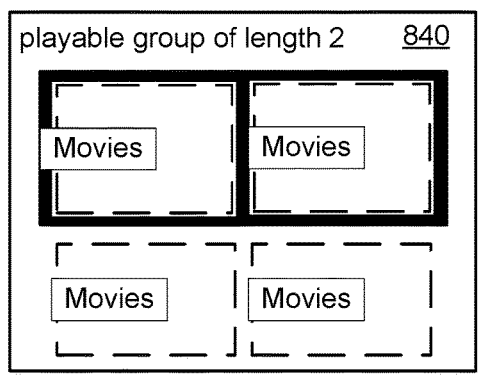
Figure 8:
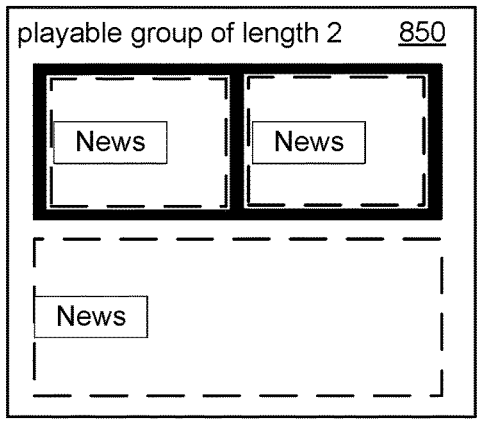
Figure 8:
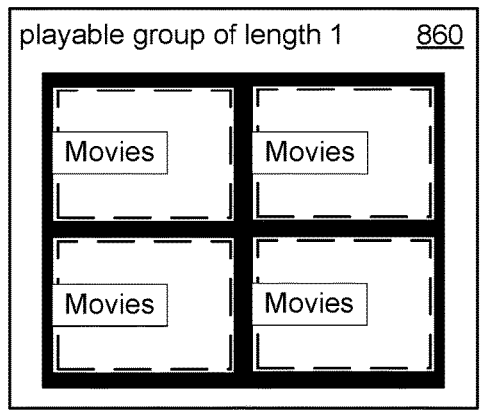
Figure 8:
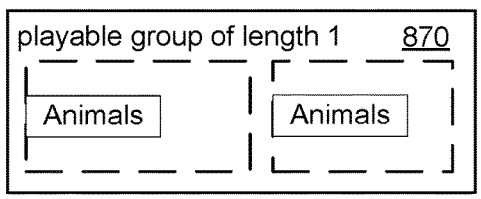

FIG. 8 shows several illustrations of playable groups associated with one or more identifiers according to an embodiment of the present invention. For example, the examples include a playable group of length one associated with identifier "news" 810, playable group of length one associated with identifier "comedy" 820, playable group of length one associated with identifier "sports" 830, playable group of length two associated with identifier "movies" 840, playable group of length two associated with identifier "news" 850, playable group of length one associated with identifier "movies" 860, and playable group of length one associated with identifier "animals" 870. One or more of these playable groups can be associated with a semantic grouping or a segmented grouping.

A semantic grouping can create clusters based on some meaningful property. For example, all items from the same category (e.g., news, comedy) may form a cluster. This type of cluster may be associated with more frequent reordering when items with similar properties are farer between. At a high level, a grouping algorithm can be "patient" in assigning videos to the layout box, because it can wait for a particular shape, category, or property.

A segmented grouping can be an extension of a semantic grouping. The grouping algorithm can split up an initial input list of items into segments and perform a semantic grouping on the segments. The algorithm may combine one or more clusters for final output. A segmented grouping can result in clusters with fewer blocks in them (more length one clusters, rather than length two clusters) and less reordering. In an embodiment, a segmentation size parameter can be adjusted to balance a group size against reordering.

In an embodiment, the metadata associated with a file or webpage can be used to determine the grouping. For example, an ESPN® website may have sports tags in the metadata, so a video preview associated with a full video on the ESPN® website may be grouped with other videos related to sports. In some examples, the "sports" category (or other categories) can be associated with the video preview because of its origin (e.g., a third party server 240) or the location of the full video (e.g., a video server 210).

In an embodiment, a grouping may be nested within another grouping. For example, a first grouping can be for "food." The first grouping can include sub-groupings, like "desserts" and "sushi." The groupings may be hierarchical, such that the first grouping has a higher priority than the sub-groupings.

V. Associating an Order to Categories or Identifiers

Figure 9:
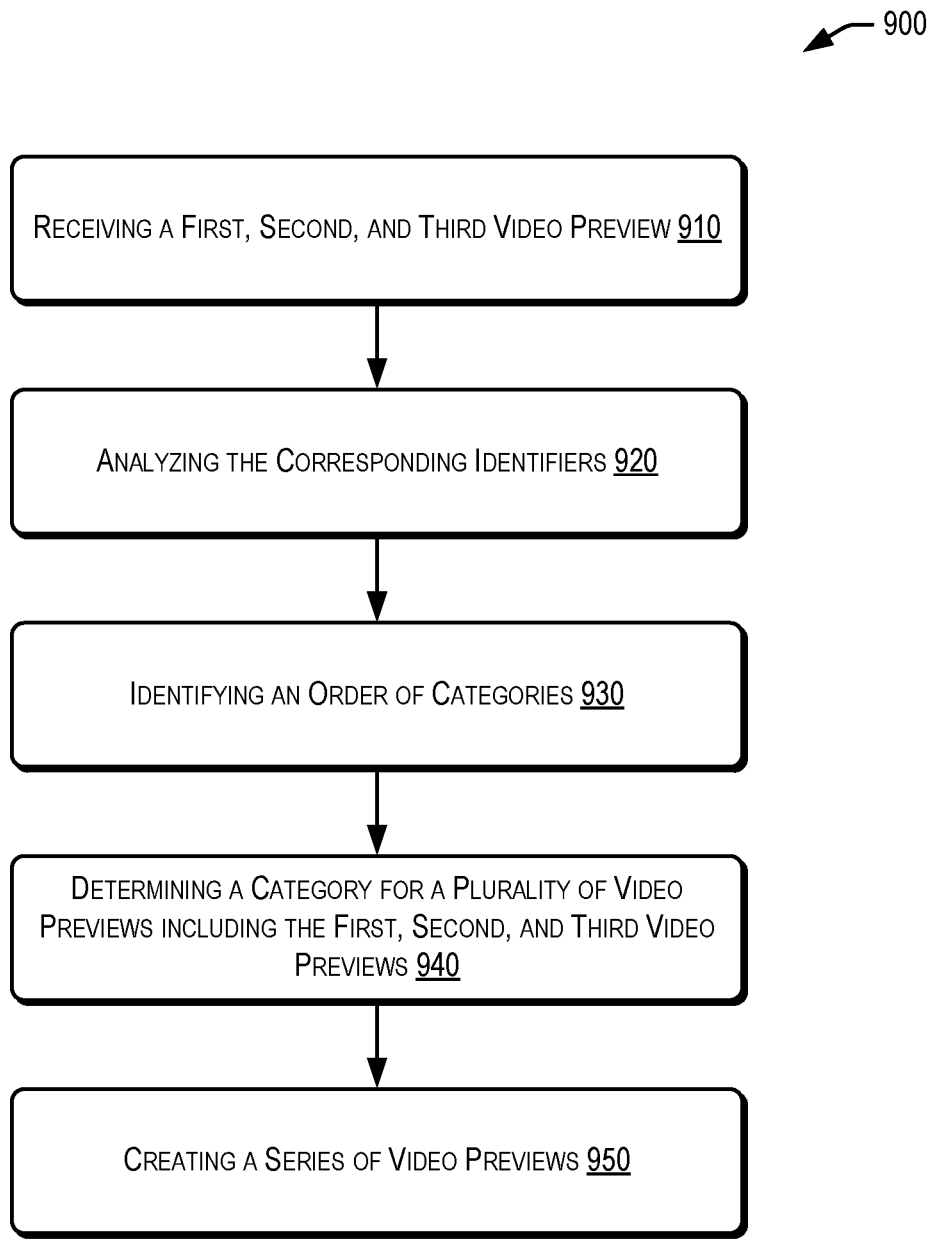
FIG. 9 shows a flowchart illustrating a method of organizing video previews according to an embodiment of the present invention.

FIG. 9 shows a flowchart illustrating a method of organizing video previews according to an embodiment of the present invention.

At block 910, a first, second, and third video preview can be received. For example, the video previews can include one or more identifiers associated with content of the video previews. The video previews can be received at the same time or different times, including in different transmissions or from different sources.

At block 920, corresponding identifiers can be analyzed. For example, the first, second, and third identifiers can identify at least one shared value between the first identifiers and the third identifiers (e.g., as illustrated and described with FIG. 3).

At block 930, an order of categories can be identified. For example, each category corresponding to different values for identifiers of video previews can be identified. The order of categories can define the relative placement of video previews in a GUI.

At block 940, a category for a plurality of video previews can be determined. For example, a category for a plurality of video previews can be determined based on values of the identifiers of the video previews. In some examples, the first video preview and the third video preview are identified as being from a first category based on the at least one shared value and the third video preview is identified as having a second category. The second category can be different from the first category based on the one or more third identifiers.

In an embodiment, one or more identifiers can be associated with a larger category (e.g., "sports" includes baseball, football, and tennis). When a larger category is identified, the larger category may not be received with the video preview. For example, the video preview can include the identifier "tennis" and the computing device (e.g., provider server 220) can identify the larger "sports" category based on the received identifier (e.g., by looking up the value in a database, by reviewing a list of associated values with identifiers, etc.). For example, "tennis" could be a sub-category of the larger category "sports."

At block 950, a series of video previews can be created. For example, the series of video previews can include the first, second, and third video previews based on the determined categories. The first and third video previews can be displayed at a location in the GUI that is displayed before the second video preview based on the order of the categories and the determined first and second categories (e.g., as illustrated with FIG. 10).

In an embodiment, the computing device can filter video previews based on a viewer. For example, a viewer may be following particular people and/or collections, and the computing device can provide similar video previews to those people and/or collections. The computing device can also filter by category, popular items, or trending items.

VI. Organizing Video Previews in a Layout by Clusters

When a cluster of video previews comes into view, the cluster can start playing. The videos associated with the cluster of video previews can be grouped by any method, including when the video previews share a visual consistency and/or come from a similar category. The consistency can make logical sense to avoid seeming jarring for the viewer. The cluster can also portray visual beauty.

Audio can also play that corresponds with the first composite and/or second composite. The audio may play while these previews are selected and/or activated, and the video associated with these groups of video previews are playing. The audio associated with other composites may be silent. When a user swipes or changes the focus, so that the other composites become activated, the computing device can gauge, in a Doppler Shift-like audio effect, how the audio would change if an object was moving farther away from the viewer. For example, the pitch may change to seem like the first composite and second composite are physically moving farther away from the viewer. The pitch may also change for the audio associated with other composites to simulate the videos physically moving closer to the viewer.

A. Initial Layout

Figure 10:
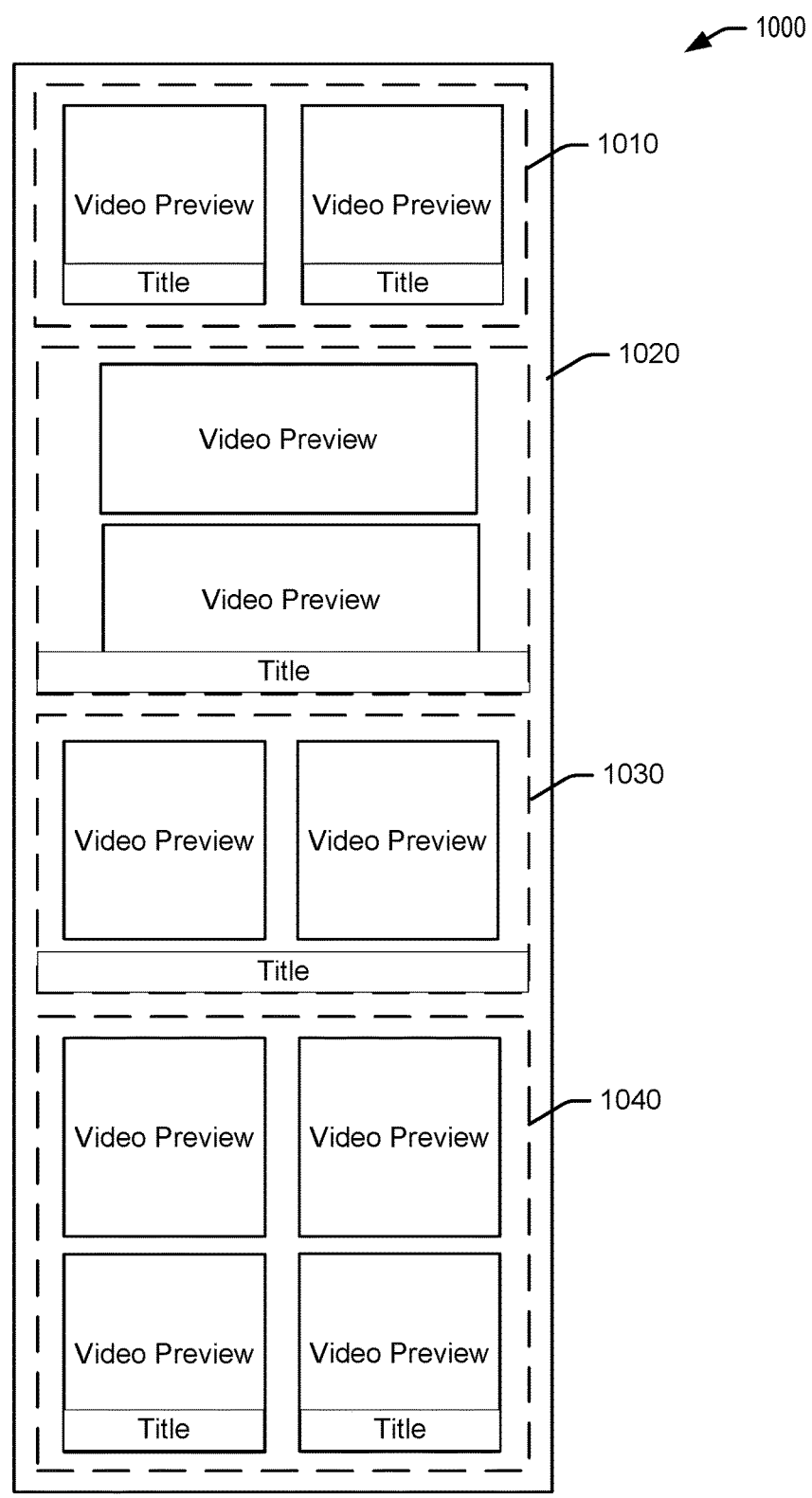
FIG. 10 shows a series of organized videos according to an embodiment of the present invention.

FIG. 10 shows a series of organized videos according to an embodiment of the present invention. For example, the computing device can generate a layout. A "layout" is a presentation of one or more clusters. A layout may be displayed on a GUI (e.g., provided on a webpage) as a stream of video previews that places new clusters of video previews at the top of the stream when the GUI is refreshed. As illustrated, the GUI 1000 includes a plurality of video previews organized in playable groups 1010, 1020, 1030, and 1040.

In some examples, the layout can be identified by an analysis of the categories associated with the playable groups (e.g., as discussed with FIG. 9). For example, the series of video previews can associate video previews in playable groups based on the determined categories. The first playable group 1010 can include sports, the second playable group 1020 can include movies, and the third playable group 1030 can include sports again. In some examples, the first and third video playable group can be displayed at a location in the GUI 1000 that is displayed before the second playable group based on the order of the categories and the determined first and second categories.

A layout may be generated based on one or more clusters. For example, the composite of video previews can be grouped to form a cluster. The computing device can group the video previews by category or collection, which can create a cluster of video previews. In an embodiment, multiple clusters may be displayed and can be organized according to some of the rules specified, including avoiding consecutive blocks, avoiding a vertical separator in the same position, and other rules.

In embodiments where a grid is used, the entire grid of video previews can play and/or stop playing according to the layout and/or actions from a viewer. This can be advantageous in conveying a uniform message to the viewer.

The curator or automated algorithm can vary the video previews so that different layouts are placed around each other. For example, the algorithm may compare a first layout with a second layout and, if the second layout is different than the first layout, the algorithm can place the second layout by the first layout. As shown with playable groups 1010 and 1020, two video previews are on one row in playable group 1010 and two video previews are in one column in playable group 1020. The algorithm may avoid layouts of the same type next to each other or in a consecutive order.

In an embodiment, the algorithm may also avoid layouts that place a vertical separator in the same position. As shown, playable group 1030 and playable group 1040 include a vertical separator in the same location (e.g., center). In some embodiments, the playable group 1040 may be reordered to a different location in the layout, or a different format may be selected for the video previews in this playable group. This may add to the visual diversity of the webpage.

In an embodiment, a preference may be given to particular layouts or items. For example, layouts associated with dual uneven blocks can be preferred over dual single blocks. Layouts associated with dual single blocks can be preferred over single blocks. Single items can be compared with multiple items, and the single items can be given a higher priority in block choice.

In an embodiment, a default format can be chosen. A default format can be implemented after each of the items has been processed and the chosen formats are not completely full. The leftover items can be referred to as "stragglers" and be placed in a composite containing one video preview or other default format.

In an embodiment, white space may be used to differentiate the clusters from each other. In another embodiment, a label or bar can be used to differentiate the clusters from each other.

B. Updating a Layout

Embodiments can add additional video previews after the initial set of video previews have been provided to a viewer. When new video previews are available to publish, the layout may be reordered (e.g., when a user refreshes his or her homepage). In an embodiment, the computing device can minimize the amount or reordering required. An automated process may incorporate the new video previews with the existing video previews or start a new format.

The video previews can be added to the layout in a cluster. When the new cluster is incorporated with the existing clusters, the new cluster may be placed at the top of the GUI. The process may also organize the new cluster so that it is placed at the top, but organized to be aesthetically pleasing (e.g., by avoiding layouts of the same type next to each other, by avoiding a vertical separator in the same position). In some examples, a cluster may be related to another cluster because they are filtered by the same category. In another example, a cluster may be placed next to another cluster because of the format of the composites used to generate the cluster.

In an embodiment, the layout can be reordered. The process can first accept the additional cluster and then analyze the cluster. The process can minimize reordering. For example, if there are ten new items, the process can give a priority to the new ten items to ensure that the preceding items can be minimally reordered. This can be advantageous because the user and/or viewer can be familiar with the layout of the existing items and if the layout is changed, the viewer can become confused when they expect to see a video in a particular location.

In another example, zero reordering may be implemented. For example, a viewer may browse to their "homepage" stream and the most recent 20 items are fetched and put on the page. Five minutes later, the viewer refreshes the homepage, and another 10 items have been shared. Zero reordering could organize all 30 items so that the layout would look the same as concatenating the layout of the 10 items and the 20 items separately.

VII. Automatically Organizing Video Previews in a Layout

In some embodiments, a grid layout algorithm can be used to define how videos and video previews are laid out in a grid that is pleasing and useful to the user. Video previews can be analyzed based on the images contained in the video preview. For example, the video preview can include one or more scenes (e.g., identified by a user when selecting images to include with the video preview from the full video, identified by similar colors across multiple images, identified by a particular time duration, etc.). When a video preview has only one scene, it is referred to as a "single" video preview. When the video preview has more than one scene, it is referred to as a "composite" video preview. Video previews can also be associated with a layout property, which indicates into how many columns the scenes should be arranged when being displayed. For example, a 2×2 composite would have four scenes and a layout indicating two columns. Video previews may also be categorized, and the categories have values like, "culture", "science", "animation", "style", etc.

It is possible to query both the aspect ratio of each of the scenes (e.g., in a composite the aspect ratios may match), as well as the combined aspect ratio of the entire video preview. For example, a single video preview whose scene is 4:3 would have a combined aspect ratio of 4:3, but a 1×2 composite whose scenes are 16:9 would have a combined aspect ratio of 8:9. In another example, a single block can include a video preview with a scene aspect ratio of 4:3, causing the aspect ratio of the single block to also have an aspect ratio of 4:3. In yet another example, a single block with a composite video preview and corresponding video preview aspect ratios are 4:3, may have an aspect ratio of 2:3 (two 4:3 images stacked on top of one another). In another example, a dual block with two video previews (e.g., both singles) with aspect ratio 4:3 may have an aspect ratio of 8:3 (two 4:3 images stacked left-to-right).

Figure 11:
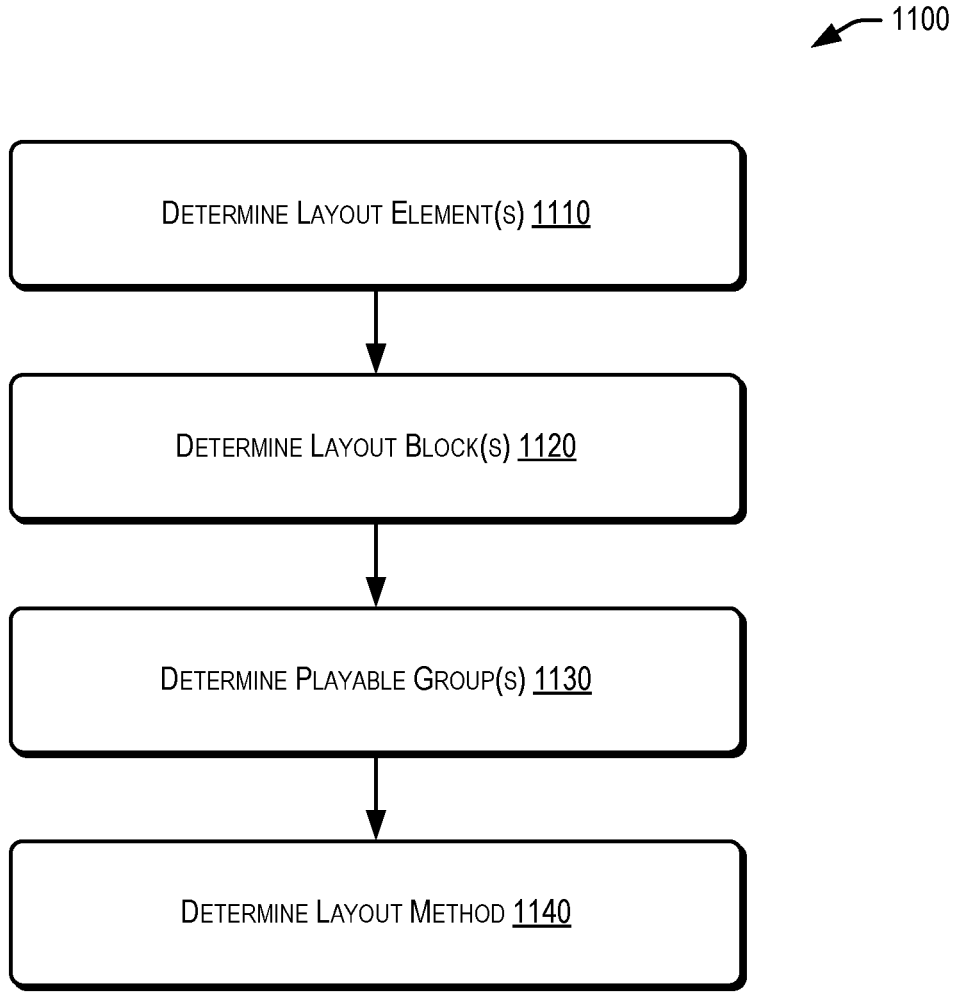
FIG. 11 shows a flowchart illustrating a method of automatically organizing video previews in a layout according to an embodiment of the present invention.

FIG. 11 shows a flowchart illustrating a method of automatically organizing video previews in a layout according to an embodiment of the present invention. The method 1100 may be implemented by any computing device (e.g., a provider server 220).

At block 1110, one or more layout elements can be determined. A layout element may be determined for each video preview and/or composite, and can represent content that is to be laid out. The layout elements can include video previews or a composite of video previews, each of which can contain one or more video previews. Layout elements are combined into layout blocks, as described in the next section and throughout the specification.

Layout elements can be associated with a common set of properties that aid in their combination into blocks. These properties may include length, aspect ratio, "cancombine" (e.g., whether the layout block can be combined with other elements in a block), and "familyid" (e.g., an identifier that indicates to which "family" the element belongs). For example, familyid can be a particular category (e.g., culture, science, animation, style).

The aspect ratio for a layout element can be calculated. For example, the aspect ratio may be calculated as a default aspect ratio (e.g., 16:9). In another example, the aspect ratio may be correlated with the aspect ratio of the video(s) represented by the element. For example, videos can be 16:9, 4:3, or an aspect ratio less than one (e.g., used when a user may have taken a video by holding their camera phone in a vertical orientation). Video layout elements can also be combined.

In some examples, the video preview layout elements have a length defined to be equal to the number of scenes in the video preview. The aspect ratio is defined to be the combined aspect ratio of the video preview. Video preview layout elements may be combined when the layout of the video preview is a single or one-column composite. The familyid of a video preview layout element can be the category of its video preview.

Layout elements may also be compared with other layout elements while performing family layout, as shown below. This comparison can be implemented by associating the order in which each element was input with the element. For example, two layout elements can be compared by comparing their respective indexes (e.g., the video preview's placement in a layout, a composite's relative order in comparison to another composite). For example, the third layout element comes before the tenth.

At block 1120, one or more layout blocks can be determined. For example, layout elements can be combined into layout blocks, which represent one or two layout elements that can be displayed (e.g., at one time, in a playable group). Three kinds of layout blocks may be identified, including halfwidth single blocks (e.g., containing one layout element), fullwidth single blocks (e.g., containing one layout element), and dual blocks (e.g., containing two layout elements). For example, a halfwidth single block can occupy only half the width of the layout area (e.g., in a GUI, on a screen of a computing device). A dual block and fullwidth single block can occupy the full width (e.g., of the GUI). In some embodiments, a type of layout block may be chosen based on an element's aspect ratio (e.g., if a single element's aspect ratio is less than 0.75, a halfwidth single block will be used, otherwise, a dualwidth single block will be used).

Layout blocks can have common properties that aid in their combination into playable groups. These properties are: length and aspect ratio. Layout blocks' length is defined as the sum of the lengths of their elements. A single block's aspect ratio is simply the aspect ratio of its element. A dual block's aspect ratio is the sum of the aspect ratios of its two elements. For example, a dual block containing elements with aspect ratios 4:3 and 16:9 would have an aspect ratio of 28:9.

Layout blocks may also be compared with one another by comparing lists of elements contained in the layout blocks lexicographically (e.g., a generalization used in mathematics that assumes an order of a group based on its components). For example, a dual block containing the first and third elements would come before a single block containing the second element.

At block 1130, one or more playable groups can be created. A playable group can be a list of one or two layout blocks. As illustrated, playable groups can include video previews that are to be played simultaneously in a grid. The layout algorithm uses test to determine whether a nonempty list of blocks is a valid playable group. The test may begin with considering the number of blocks in the list. If the list has only one block, it is a valid playable group. If the list has more than two blocks, it is invalid.

Next, lists with two blocks can be considered. If the sum of the lengths of the two blocks is greater than four, the list may be considered invalid. For example, in certain types of algorithms that help manage the blocks (e.g., a greedy algorithm), the different configurations of blocks can be submitted to the algorithm (e.g., provided through code on a computing device) to determine a playable group. By iteratively increasing the number of blocks submitted, a maximal number of playable groups can be determined. When the computing device determines that the list is invalid, the computing device can use the list that was submitted just previously (e.g., that would be the largest valid playable group under current consideration). The core idea with this rule may be to limit the number of simultaneously playing scenes in order to prevent the user from having his or her attention split across too much motion.

The sum of the lengths of the two blocks may be less than four scenes. If the aspect ratio of the first or second block is less than one, it can be invalid. For example, the consider two 1×2 composites where the scene aspect ratios are all 2:1. Each composite can have an aspect ratio of 1:1, so consequently each block can have an aspect ratio of 1:1, and this part of the test may not fail. In another example, consider two 1×2 composites where the scene aspect ratios are all 16:9. Each composite can have an aspect ratio of 8:9, which is less than 1, so this example may fail this part of the test. In some examples, the determination of whether the video previews are contained in composites is not the determining factor, but rather the aspect ratio of each block. Imagine two blocks whose aspect ratios are each less than 1. Then each of them can be fairly tall in order to occupy the width assigned to it. Putting them side-by-side, the whole group would have to be similarly tall. Visually, the layout of the group may be less visually pleasing because the blocks may not fit relatively well together onscreen. The core idea with this rule may be to ensure that the two blocks will fit relatively well together onscreen.

The layout may contain one or more lists of two blocks representing less than four scenes, where at least one of the blocks is at least as wide as a square. If either of the two blocks has an aspect ratio of at least two, the list represents a valid playable group. It is otherwise invalid. The core idea of this final rule is to ensure that neither of the two blocks is too narrow (e.g., having one side of the block dominating the display width, and the other side of the block being squished down could be unappealing).

At block 1140, a layout method can be determined. The layout method can be a simple layout or a family layout (e.g., as identified with FIG. 9).

A. Simple Layout

In a simple layout, the simple layout is split into two subtasks, taking input elements and making blocks, and taking input blocks and making playable groups. Simple layout can analyze the input elements, make (e.g., generate, create) the blocks, then make (e.g., generate, create) the playable groups.

To make blocks, the simple layout may first initialize the output list of blocks as an empty list and initialize a reference to the "last" element as undefined. The computing device can analyze each element. For example, if the last element is undefined, the simple layout can set the last element to the current element, and skip to the next iteration of the loop. Next, the simple layout can determine whether to create a dual block or a single block. If both of the elements permit combination, consider the aspect ratios of each block, a1 and a2, and create a dual block if min(a1, a2)/max(a1,a2)>0.4. The restriction may help keep a dual block from becoming too narrow (e.g., otherwise the block may be very tall in order to take up the full width of the screen).

The simple layout may vary by the type of block. For example, in the case of creating a dual block, the layout algorithm can create the dual block, append it to the blocks list, set the last element to undefined, and continue with the next iteration of the loop. In the case of creating a single block, the layout algorithm can create the single block with the last element, append it to the blocks list, set the last element to the current element, and continue with the next iteration of the loop. If the last element is not undefined (e.g., when the list of input elements has an odd length), then create a single block from the last element and append that block to the blocks list. The list of output blocks may be complete and provided (e.g., for the user, to the GUI, for the computing device).

To make playable groups, the layout algorithm can progressively determine the largest number of video previews that can be combined (e.g., using a greedy algorithm, going through the list of blocks to create sequential playable groups that are as large as possible). For example, the computing device can select a sublist of increasing length, starting from the beginning of the list of input blocks and determining whether the block is part of a group or not (e.g., described above). Once layout algorithm encounters a sublist that is no longer a valid playable group, the layout algorithm appends the next smallest sublist to the list of output playable groups, excludes these elements from the input list, and repeats the process. This continues until all of the input blocks have been exhausted.

B. Family Layout

Family layout can analyze the input elements, make (e.g., generate, create) the blocks, and make (e.g., generate, create) the playable groups, with an additional consideration. For example, each of the blocks in the playable groups can have the same familyid. Within the bounds of this constraint, the family layout can also try to preserve original ordering of the input elements as much as possible (e.g., via a min heap or other method for ordering playable groups). For example, the order can continuously find the "least" (e.g., the one with the smallest order) playable group across all families. In some embodiments, the least may help determine video previews in a playable group in order to minimize reordering. As illustrated, a playable group here can simply include a list of blocks, which includes a list of elements. An element can include the same sort order as the order in which the element was input into the family layout. When two lists of things are compared, a lexicographic order can be used. For example, [1]<[2]. [2]<[3]. [1,2]<[1] because it's longer. [1,2]==[1,2]. [1,2]<[1,3].

The family layout can make the blocks and playable groups using a similar method as the simple layout, and then determine ordering (e.g., using the min heap). In some examples, a min heap can be a way to order the incoming playable groups through the use of data nodes in an abstract tree structure (e.g., the parent node may be less than its children nodes).

For example, the layout method can first segment all of the input layout elements into separate lists, each list representing a distinct familyid value. For each of these lists of elements, a simple layout can be applied. Each input block with a familyid can be associated with at least one list of playable groups. The playable group can be added to the ordering (e.g., min heap) to place in the layout.

For the remaining input blocks that do not include a familyid, initialize the list of output groups to an empty list. While there are any lists of playable groups remaining in the min heap, iteratively progress through the following steps. The least list can be removed from the min heap. Remove the first playable group and append it to the list of output groups. If there are any remaining playable groups in the list, insert the playable groups back into the min heap. Continue to the next iteration of the loop to complete the output list of playable groups.

The playable groups created by the family layout can include elements in the same family (e.g., same value identifier, same or similar categories). However, the fact that the input elements are first separated by familyid can mean that the order of the elements in the final output does not exactly match the input. For example, if the input consists of elements belonging to families A, B, and A, then the output could be a dual block with the first and third elements, both of family A, and a single block with the second element, of family B. Thus, in this example, the third element precedes the second. However the fact that different familyids are usually well distributed across the input elements, combined with the use of the min heap, means that the reordering is minimized.

VIII. Displaying Video Previews Outside of a Layout

A. Via a Toolbar

Figure 12:
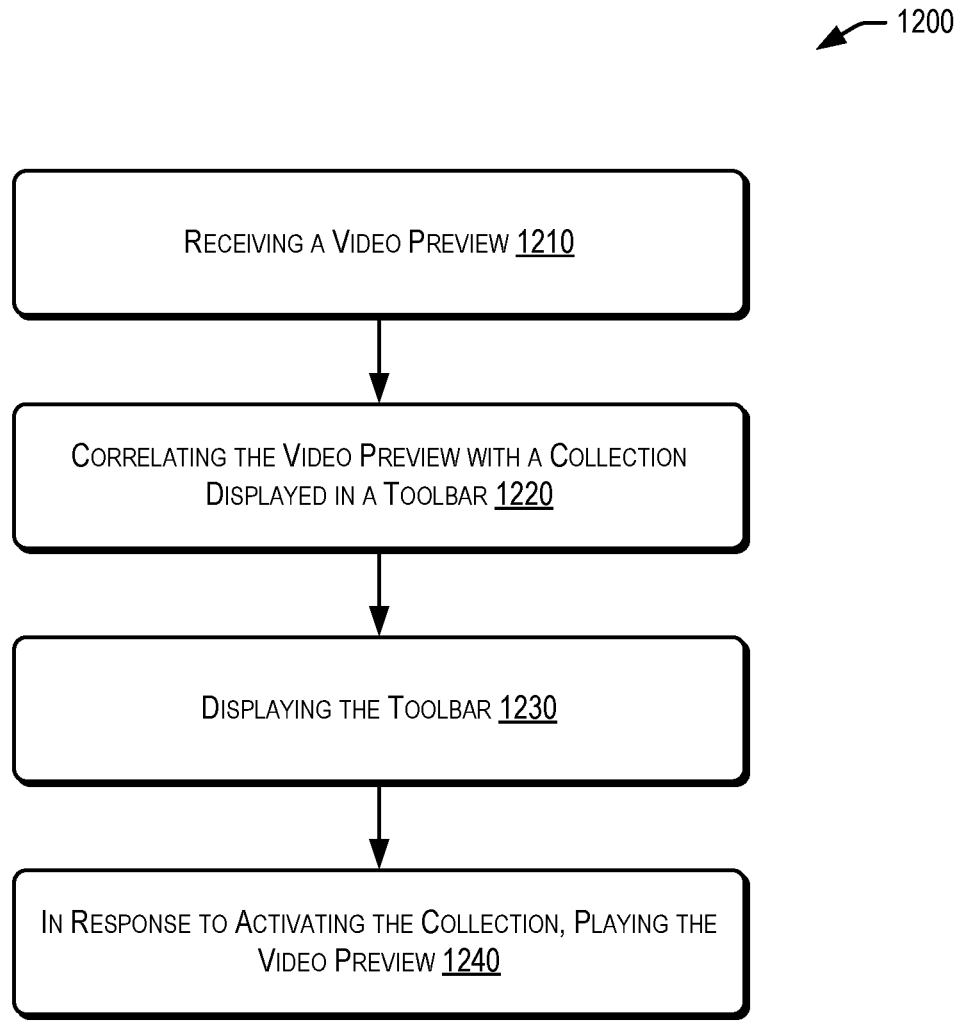
FIG. 12 shows a flowchart illustrating a method of displaying video previews that are accessible in a collection according to an embodiment of the present invention.

FIG. 12 shows a flowchart illustrating a method of displaying video previews that are accessible in a collection according to an embodiment of the present invention.

In some embodiments, the toolbar can be displayed before the video preview is received. For example, the toolbar can include a tool (e.g., an "add video preview" tool) that the user can activate that requests to correlate the video preview with the collection of video previews. In another example, the toolbar may not be displayed before the video preview is received. For example, the video preview may be correlated with the collection in response to an identification that a new video preview has been provided to the layout. In yet another example, the toolbar can be displayed at least twice (e.g., once before the video preview is correlated with the collection and once after the video preview is correlated with the collection).

At block 1210, a video preview can be received. For example, the video previews can include one or more identifiers associated with content of the video previews. The video previews can be received at the same time or different times, including in different transmissions or from different sources.

At block 1220, the video preview can be correlated with a collection displayed in a toolbar (e.g., based on an identifier or category, based on user input, etc.). For example, the toolbar may be displayed so that the user can select an "add video preview" tool to add the video preview to the collection. In another example, the first video preview can be correlated with a collection of video previews automatically without displaying the toolbar. The collection can be associated with a toolbar GUI by the computing device.

At block 1230, the toolbar can be displayed (e.g., to show the toolbar with the collection, to access the collection with the correlated video preview, etc.). For example, the toolbar may be displayed in one portion of the GUI so that the rest of the GUI is available to display video previews or other information. The portion of the GUI can be lower, upper, or side positions of the GUI, such that the toolbar overlays on top of one or more video previews.

At block 1240, the video preview can be played in response to activating the collection. For example, the collection may be activated (e.g., by moving to a particular location, by a user's interaction with the playable group, by default when the GUI is opened by an application). Once the activation is identified, the GUI can play the video previews associated with the collection. For example, the GUI can play the video portion in a continuous loop, a limited loop that would stop after a certain number of times, or stop after one time. The GUI may also play the video preview forwards and/or backwards. In other examples, the collection may include one or more playable groups so that when the playable group is activated within the collection, the video previews in the playable group can start playing.

Figure 13:
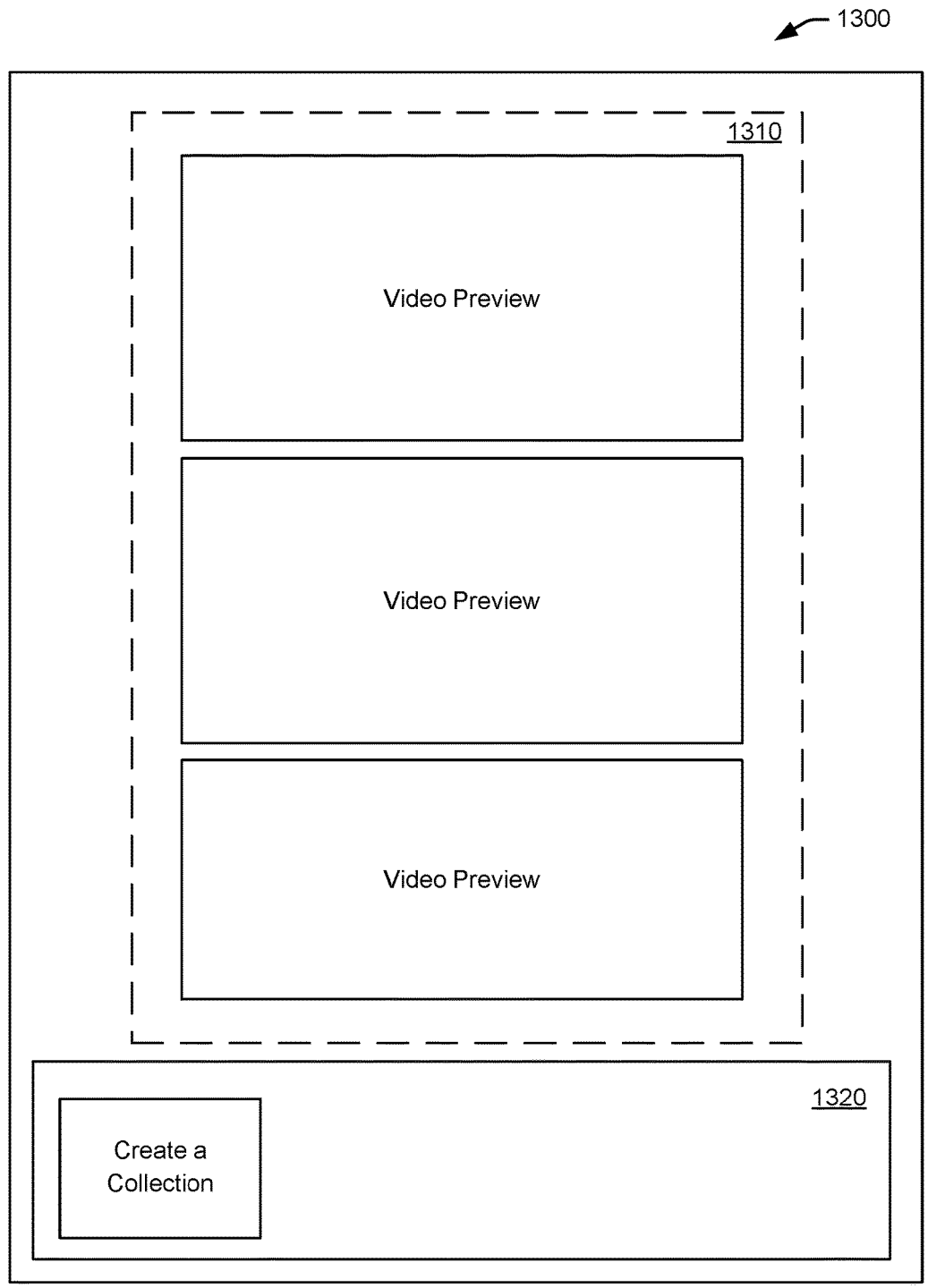
FIG. 13 shows a graphical user interface that illustrates a toolbar according to an embodiment of the present invention.

FIG. 13 shows a graphical user interface (GUI) that illustrates a toolbar according to an embodiment of the present invention. For example, GUI 1300 can include one or more video previews (e.g., in blocks, clusters). The composite of video previews 1310 can be displayed in a layout. The user can activate a toolbar 1320 to save the video previews to a location outside of the layout, where the user can access the video previews independently.

For example, the GUI 1300 can include a "create a collection" option in the toolbar 1320 which allows the user to save a link to another user's collection so that the collection is easily accessible for future use. In an embodiment, a reference to the video preview can be stored in a database and associated with a user. The reference can confirm that the user created, uploaded, and/or collected the video preview, and the video preview should be displayed for the user.

Figure 14:
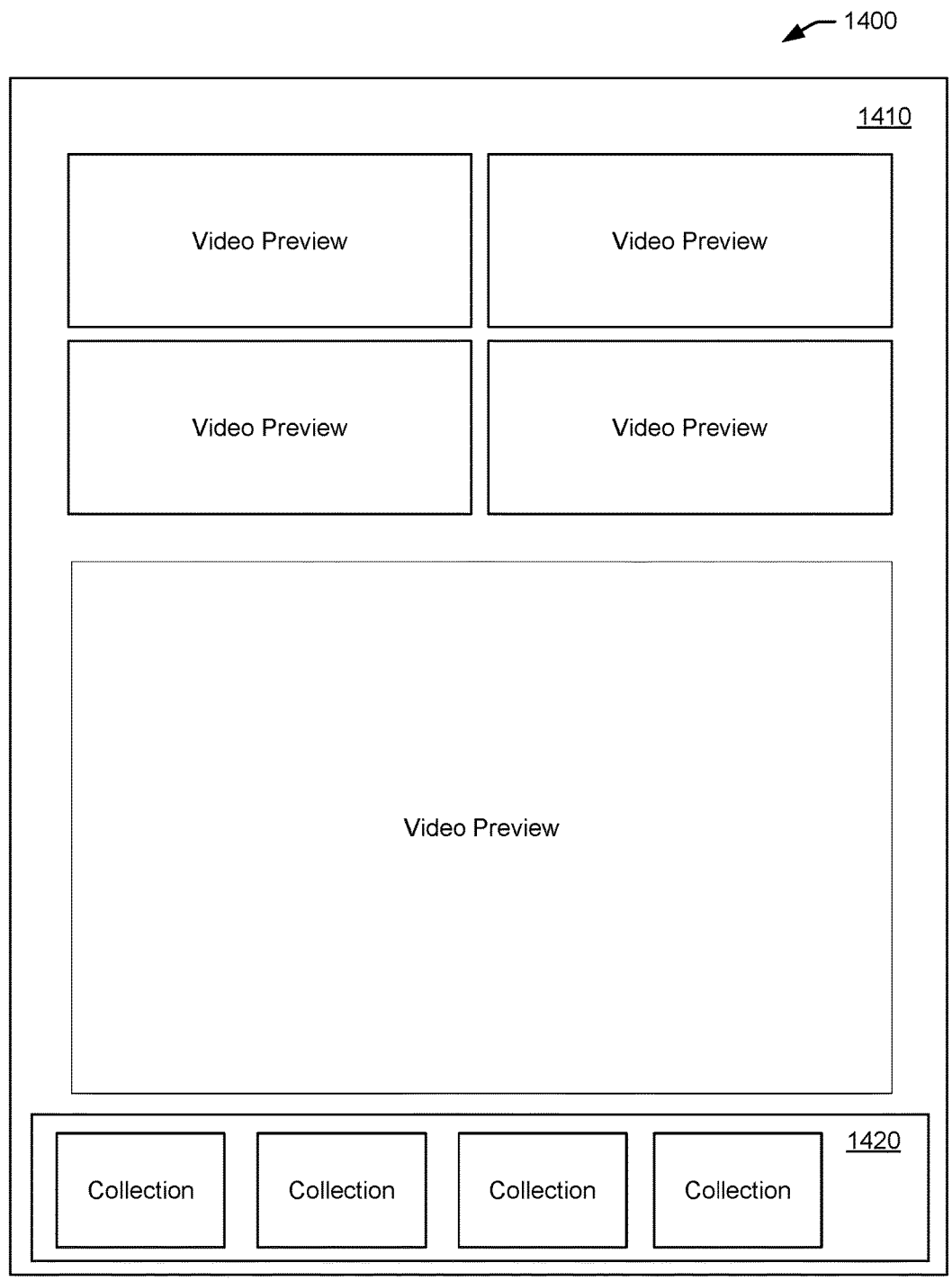
FIG. 14 shows a graphical user interface that illustrates a populated toolbar according to an embodiment of the present invention.

FIG. 14 shows a GUI that illustrates a populated toolbar according to an embodiment of the present invention. For example, GUI 1400 includes one or more video previews in a layout 1410 and toolbar 1420 with one or more collections.

Once the video previews are associated with a toolbar 1420, the user can use the GUI 1400 (e.g., accessible via a webpage or application) to view the video previews accessible via the toolbar. The video preview can also provide a link to a full video. The user can access the full video by tapping or selecting the video preview.

In an embodiment, the toolbar can comprise functionality to add a video preview to a collection that the user has already created. For example, if a user has created a collection called "Desserts I Love!" and the user finds a video preview for a new dessert that they would like to include in that collection or category, the user can select the toolbar and select an option to add the video preview to the collection. This is advantageous because the user can easily return to the video preview in the future and share it.

In some embodiments, a user can swipe or scroll through the collections provided by the toolbar and select one of the collections. When the user selects a collection, the video previews associated with the collection can be displayed for the user. In an embodiment, the toolbar may be hidden after the user selects a collection to browse.

The toolbar can allow a user to like or provide comments for a video preview. The video preview can be shared via several messaging services accessible through the toolbar, including iMessage, short message service (SMS), or e-mail. In an embodiment, the video preview can be displayed in-line in the messaging service. For example, if the video preview is added to an e-mail message, the video preview can play in the e-mail once it is added to the e-mail, the user can select "send" to send the email, and the video preview can play for the recipient of the e-mail without activating the video preview to play.

B. Via a Direct Link or Homepage

Figure 15:
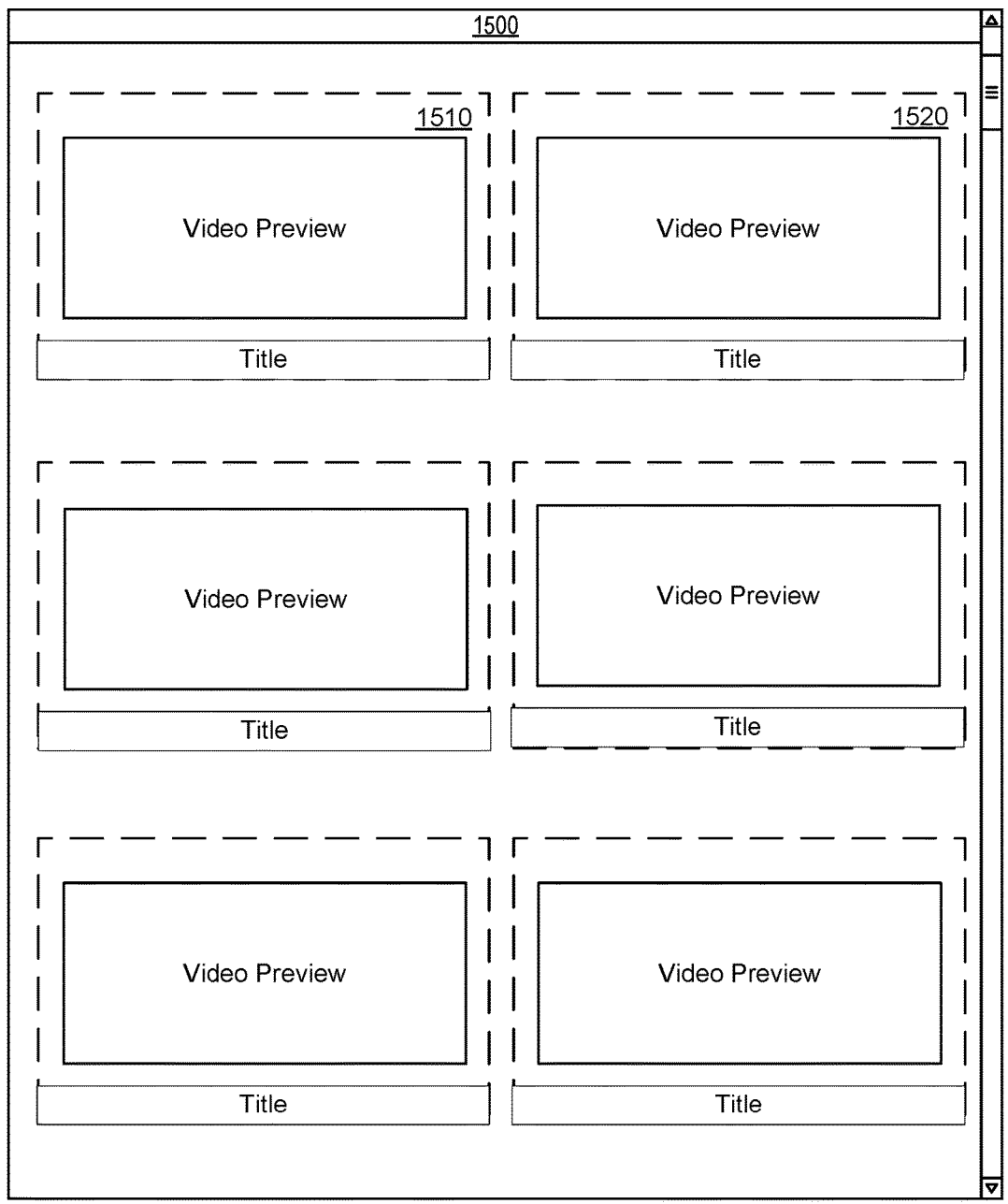
FIG. 15 shows a graphical user interface that illustrates a plurality of collections according to an embodiment of the present invention.

FIG. 15 shows a GUI that illustrates a plurality of collections according to an embodiment of the present invention. For example, the GUI 1500 can display one or more collections that include one or more video previews, including a first collection 1510 and a second collection 1520. The first collection 1510 and second collection 1520 can be identified by a video preview, title, description of the collection, the number of video previews associated with the collection, or other information related to the collection or helping the user determine whether to browse to the collection.

IX. Example Subsystems and Components

Figure 16:
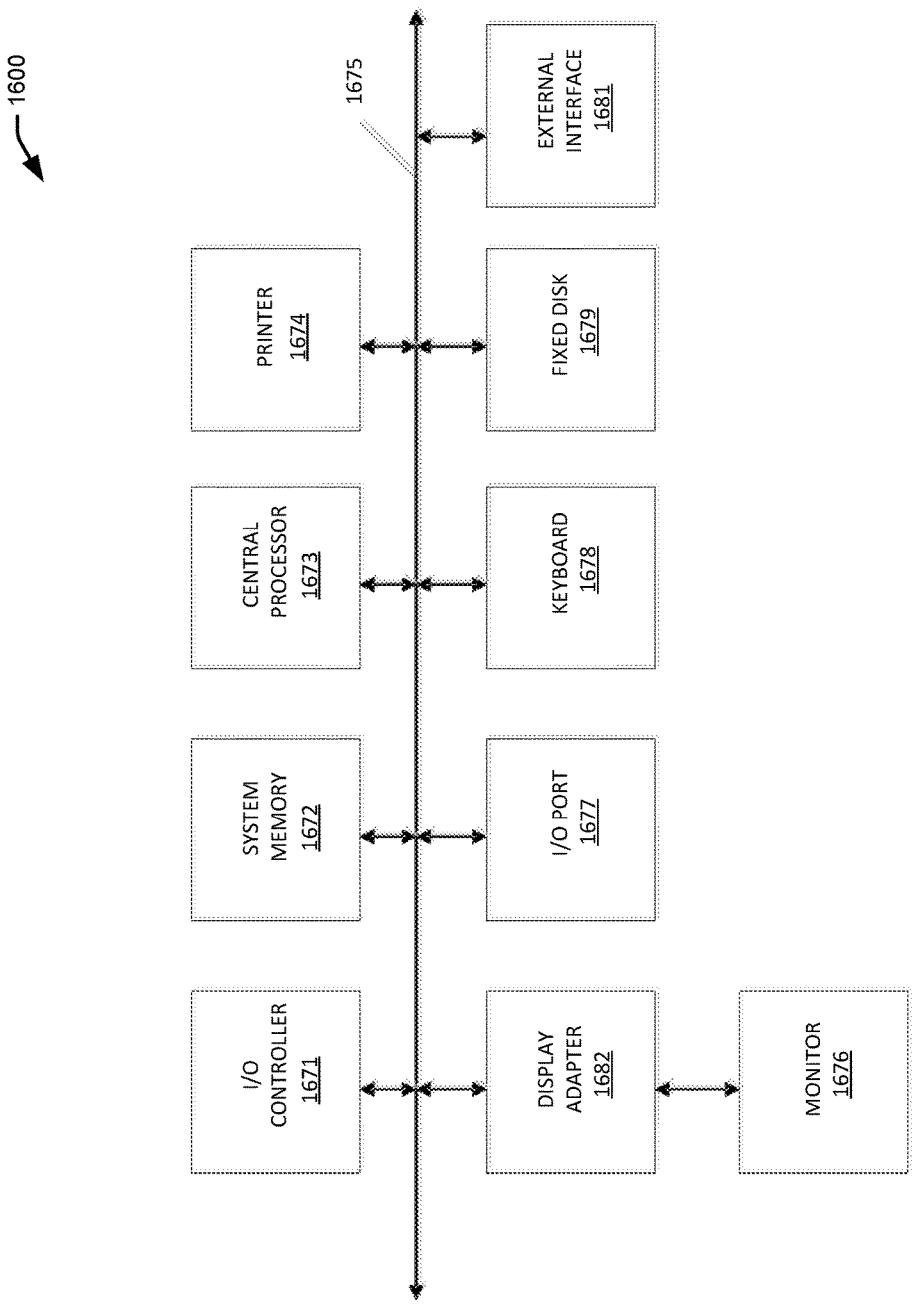
FIG. 16 shows a block diagram of a computer apparatus according to an embodiment of the present invention.

Any of the clients or servers may utilize any suitable number of subsystems. Examples of such subsystems or components are shown in FIG. 16. The subsystems shown in FIG. 16 are interconnected via a system bus 1675. Additional subsystems such as a printer 1674, keyboard 1678, fixed disk 1679, monitor 1676, which is coupled to display adapter 1682, and others are shown. Peripherals and input/output (I/O) devices, which couple to I/O controller 1671, can be connected to the computer system by any number of means known in the art, such as input/output (I/O) port 1677 (e.g., USB, FireWire®). For example, I/O port 1677 or external interface 1681 (e.g. Ethernet, Wi-Fi, etc.) can be used to connect the computer apparatus to a wide area network such as the Internet, a mouse input device, or a scanner. The interconnection via system bus allows the central processor 1673, which may include one or more processors, to communicate with each subsystem and to control the execution of instructions from system memory 1672 or the fixed disk 1679 (such as a hard drive or optical disk), as well as the exchange of information between subsystems. The system memory 1672 and/or the fixed disk 1679 may embody a computer readable medium. Any of the data mentioned herein can be output from one component to another component and can be output to the user.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java®, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method of displaying a video, the method comprising:
   receiving, at a computing device, a first video preview and one or more first video categories, wherein the one or more first video categories associated with content of the first video preview;
   receiving, at the computing device, a second video preview and one or more second video categories, wherein the one or more second video categories associated with content of the second video preview;
   receiving, at the computing device, a third video preview and one or more third video categories, wherein the one or more third video categories associated with content of the third video preview;
   analyzing, by the computing device, the one or more first video categories, the one or more second video categories, and the one or more third video categories to identify a shared value between the one or more first video categories and the one or more second video categories, but not the one or more third video categories;
   automatically creating, by the computing device, a first playable group by combining at least the first video preview and the second video preview based on the shared value between the one or more first and the one or more second video categories, and wherein the video previews in the playable group play simultaneously when the first playable group is activated;
   automatically creating, by the computing device, a second playable group of the third video preview, wherein the third video preview plays when the second playable group is activated;
   determining a first aspect ratio associated with the first video preview; and
   adjusting a second aspect ratio associated with the second video preview to correspond with the first aspect ratio, wherein the first video preview and second video preview to be displayed on a single row in the first playable group in a graphical user interface (GUI).

2. The method of claim 1, further comprising:
   providing the first playable group to the graphical user interface (GUI) by the computing device, wherein an activation of the first playable group is received at the GUI.

3. A method of displaying a video, the method comprising:
   receiving, at a computing device, a first video preview and one or more first video categories, wherein the one or more first video categories associated with content of the first video preview;
   receiving, at the computing device, a second video preview and one or more second video categories, wherein the one or more second video categories associated with content of the second video preview;

receiving, at the computing device, a third video preview and one or more third video categories, wherein the one or more third video categories associated with content of the third video preview;

analyzing, by the computing device, the one or more first video categories, the one or more second video categories, and the one or more third video categories to identify a shared value between the one or more first video categories and the one or more second video categories, but not the one or more third video categories;

automatically creating, by the computing device, a first playable group by combining at least the first video preview and the second video preview based on the shared value between the one or more first and the one or more second video categories, and wherein the video previews in the playable group play simultaneously when the first playable group is activated;

automatically creating, by the computing device, a second playable group of the third video preview, wherein the third video preview plays when the second playable group is activated;

receiving a fourth video preview;

determining a fourth video category associated with the fourth video preview;

comparing the one or more third video categories with the fourth video category; and when at least one of the one or more third video categories and the fourth video category are the same, adding the fourth video preview to the second playable group.

4. A method of displaying a video, the method comprising:

receiving, at a computing device, a first video preview and one or more first video categories, wherein the one or more first video categories associated with content of the first video preview;

receiving, at the computing device, a second video preview and one or more second video categories, wherein the one or more second video categories associated with content of the second video preview;

receiving, at the computing device, a third video preview and one or more third video categories, wherein the one or more third video categories associated with content of the third video preview;

analyzing, by the computing device, the one or more first video categories, the one or more second video categories, and the one or more third video categories to identify a shared value between the one or more first video categories and the one or more second video categories, but not the one or more third video categories;

automatically creating, by the computing device, a first playable group by combining at least the first video preview and the second video preview based on the shared value between the one or more first and the one or more second video categories, and wherein the video previews in the playable group play simultaneously when the first playable group is activated;

automatically creating, by the computing device, a second playable group of the third video preview, wherein the third video preview plays when the second playable group is activated;

receiving a fourth video preview;

determining a fourth video category associated with the fourth video preview;

comparing the one or more third video categories with the fourth video category;

when at least one of the one or more third video categories and the fourth video category are different, identifying a third playable group of video previews, wherein the third playable group of video previews includes the fourth video preview; and updating a series of video previews to include the third playable group of video previews with the first playable group and the second playable group.

5. A method of displaying a video, the method comprising:

receiving, at a computing device, a first video preview that includes a first category associated with content of the first video preview;

receiving, at the computing device, a second video preview that includes a second category associated with content of the second video preview;

receiving, at the computing device, a third video preview that includes a third category associated with content of the third video preview, wherein the first, second, and third categories are different;

identifying an order of categories, wherein the order of categories defines a relative placement of video previews in a graphical user interface (GUI);

determining that the third category is a first sub-category of a larger category in a hierarchy of categories;

determining that the third category is associated with the first category based at least in part on the first category also being a second sub-category of the larger category in the hierarchy of categories, but not the second category;

automatically updating a series of video previews to place the third video preview next to the first video preview based on the hierarchy of categories;

determining a first aspect ratio associated with the first video preview; and adjusting a second aspect ratio associated with the second video preview to correspond with the first aspect ratio, wherein the adjusted second aspect ratio enables the first video preview and second video preview to be displayed on a single row in the GUI.

6. The method of claim 5, wherein the order of categories is reordered to avoid presenting a vertical separator in a same location across the first, second, and third video previews.

7. The method of claim 5, further comprising:

receiving a fourth video preview associated with a fourth category;

determining that the fourth category is the same as the second sub-category; and updating the series of video previews to place the fourth video preview next to the first video preview, based at least in part on the determination of the fourth category is associated with the first category via the second sub-category.

8. The method of claim 5, wherein the first sub-category and second sub-category are different sub-categories.

9. A computer product comprising a non-transitory computer readable medium storing a plurality of instructions that when executed control a computer system to display a video, the instructions comprising:

receive a first video preview and one or more first video categories, wherein the one or more first video categories associated with content of the first video preview;

receive a second video preview and one or more second video categories, wherein the one or more second video categories associated with content of the second video preview;

receive a third video preview and one or more third video categories, wherein the one or more third video categories associated with content of the third video preview;

analyze the one or more first video categories, the one or more second video categories, and the one or more third video categories to identify a shared value between the one or more first video categories and the one or more second video categories, but not the one or more third video categories;

automatically create a first playable group by combining at least the first video preview and the second video preview based on the shared value between the one or more first and the one or more second video categories, and wherein the video previews in the playable group play simultaneously when the first playable group is activated;

automatically create a second playable group of the third video preview, wherein the third video preview plays when the second playable group is activated;

determine a first aspect ratio associated with the first video preview; and adjust a second aspect ratio associated with the second video preview to correspond with the first aspect ratio, wherein the first video preview and second video preview to be displayed on a single row in the first playable group in a graphical user interface (GUI).

10. A computer product comprising a non-transitory computer readable medium storing a plurality of instructions that when executed control a computer system to display a video, the instructions comprising:

receive a first video preview and one or more first video categories, wherein the one or more first video categories associated with content of the first video preview;

receive a second video preview and one or more second video categories, wherein the one or more second video categories associated with content of the second video preview;

receive a third video preview and one or more third video categories, wherein the one or more third video categories associated with content of the third video preview;

analyze the one or more first video categories, the one or more second video categories, and the one or more third video categories to identify a shared value between the one or more first video categories and the one or more second video categories, but not the one or more third video categories;

automatically create a first playable group by combining at least the first video preview and the second video preview based on the shared value between the one or more first and the one or more second video categories, and wherein the video previews in the playable group play simultaneously when the first playable group is activated;

automatically create a second playable group of the third video preview, wherein the third video preview plays when the second playable group is activated;

receive a fourth video preview;

determine a fourth video category associated with the fourth video preview;

compare the one or more third video categories with the fourth video category; and when at least one of the one or more third video categories and the fourth video category are the same, add the fourth video preview to the second playable group.

11. A computer product comprising a non-transitory computer readable medium storing a plurality of instructions that when executed control a computer system to display a video, the instructions comprising:

receive a first video preview and one or more first video categories, wherein the one or more first video categories associated with content of the first video preview;

receive a second video preview and one or more second video categories, wherein the one or more second video categories associated with content of the second video preview;

receive a third video preview and one or more third video categories, wherein the one or more third video categories associated with content of the third video preview;

analyze the one or more first video categories, the one or more second video categories, and the one or more third video categories to identify a shared value between the one or more first video categories and the one or more second video categories, but not the one or more third video categories;

automatically create a first playable group by combining at least the first video preview and the second video preview based on the shared value between the one or more first and the one or more second video categories, and wherein the video previews in the playable group play simultaneously when the first playable group is activated;

automatically create a second playable group of the third video preview, wherein the third video preview plays when the second playable group is activated;

receive a fourth video preview;

determine a fourth video category associated with the fourth video preview;

compare the one or more third video categories with the fourth video category;

when at least one of the one or more third video categories and the fourth video category are different, identify a third playable group of video previews, wherein the third playable group of video previews includes the fourth video preview; and update a series of video previews to include the third playable group of video previews with the first playable group and the second playable group.

12. A computer product comprising a non-transitory computer readable medium storing a plurality of instructions that when executed control a computer system to display a video, the instructions comprising:

receive a first video preview that includes a first category associated with content of the first video preview;

receive a second video preview that includes a second category associated with content of the second video preview;

receive a third video preview that includes a third category associated with content of the third video preview, wherein the first, second, and third categories are different;

identify an order of categories, wherein the order of categories defines a relative placement of video previews in a graphical user interface (GUI);

determine that the third category is a first sub-category of a larger category in a hierarchy of categories;

determine that the third category is associated with the first category based at least in part on the first category also being a second sub-category of the larger category in the hierarchy of categories, but not the second category;

automatically update a series of video previews to place the third video preview next to the first video preview based on the hierarchy of categories;

determine a first aspect ratio associated with the first video preview; and adjust a second aspect ratio associated with the second video preview to correspond with the first aspect ratio, wherein the adjusted second aspect ratio enables the first video preview and second video preview to be displayed on a single row in the GUI.

* * * * *